(12) United States Patent
Sato

(10) Patent No.: US 7,321,445 B2
(45) Date of Patent: Jan. 22, 2008

(54) IMAGE PROCESSING APPARATUS AND CONTROL METHOD THEREFOR

(75) Inventor: Hiroyuki Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 41 days.

(21) Appl. No.: 11/212,651

(22) Filed: Aug. 29, 2005

(65) Prior Publication Data

US 2005/0280854 A1 Dec. 22, 2005

Related U.S. Application Data

(62) Division of application No. 09/788,409, filed on Feb. 21, 2001, now Pat. No. 6,982,811.

(30) Foreign Application Priority Data

| Feb. 22, 2000 | (JP) | ............................. 2000-044728 |
| Apr. 14, 2000 | (JP) | ............................. 2000-114181 |
| Apr. 14, 2000 | (JP) | ............................. 2000-114182 |
| Feb. 13, 2001 | (JP) | ............................. 2001-036022 |

(51) Int. Cl.
*G06F 15/00* (2006.01)
*G06K 1/00* (2006.01)

(52) U.S. Cl. ...................... 358/1.4; 358/1.15; 358/1.16; 358/1.18; 358/1.14

(58) Field of Classification Search ............... 358/1.15, 358/1.14, 1.16, 1.18
See application file for complete search history.

(56) References Cited

U.S. PATENT DOCUMENTS

| 5,563,986 | A | * | 10/1996 | Suzuki | ....................... 358/1.15 |
| 6,043,897 | A | | 3/2000 | Morikawa et al. | ......... 358/1.14 |
| RE37,272 | E | * | 7/2001 | Ochi et al. | ................. 358/1.15 |
| 6,388,765 | B1 | * | 5/2002 | Nagano et al. | ............ 358/1.18 |
| 6,421,135 | B1 | | 7/2002 | Fresk et al. | ................ 358/1.15 |
| 6,480,297 | B1 | * | 11/2002 | Suzuki et al. | ............. 358/1.16 |
| 6,498,657 | B1 | * | 12/2002 | Kuntz et al. | ............... 358/1.15 |
| 6,707,563 | B1 | | 3/2004 | Barry et al. | ............... 358/1.15 |
| 6,785,013 | B1 | * | 8/2004 | Ota et al. | .................. 358/1.15 |
| 6,982,811 | B2 | * | 1/2006 | Sato | ........................... 358/1.4 |

* cited by examiner

*Primary Examiner*—Douglas Q. Tran
*Assistant Examiner*—Satwant Singh
(74) *Attorney, Agent, or Firm*—Fitzpatrick, Cella, Harper & Scinto

(57) ABSTRACT

In a data processing apparatus which forms a file having a plurality of pages on the basis of image data obtained by sequentially reading images on a plurality of originals, forms a file having the attribute information and end information representing the end of the file for each page, and transmits the file, when file creation processing is interrupted midway during file creation, the end information of the file is added at the interrupt time, thereby transmitting a normal file. In addition, data to be formed into one file is divided into a plurality of blocks in units of pages, and a plurality of files each having end information are sequentially transmitted. At this time, information for allowing the receiving side to convert the divided files into one file is transmitted. Furthermore, a plurality of data stored in a memory are appropriately selected, one file having a plurality of pages is formed on the basis of the selected data, and a file having the attribute information and file end information for each page is formed and transmitted.

6 Claims, 31 Drawing Sheets

FIG. 14

| Status | | | Log | | |
|---|---|---|---|---|---|
| Job No. | Time | Destination | | | Status |
| 0139 | 11:47 | 00 Ganon FILE | | | Sending |
| 0139 | 11:47 | Ganon U.K. E-MAIL | | | Waiting |
| 0139 | 11:47 | Ganon INC. I-FAX | | | Waiting |

A20

1/1 ◁ ▷

Details ▲

Cancel    Print

A21

Copy  Send  Fax  Print  Receive  Device

Done

FIG. 18

```
2 0 obj
<<
/Type /Pages
/Kids [ 1 0 R 7 0 R ··· 1194 0 R 1200 0 R ··· 2394 0 R]
/Count 400
>>
endobj
```

```
xref
0 1
0000000000 65535 f
2 1
0000110000 00000 n
1200 1200
0000101500 00000 n
0000102000 00000 n
...
0000109850 00000 n
0000109900 00000 n
0000109950 00000 n
```

```
trailer
<<
/Size 2398
/Root 1 0 R
/Prev 101000
/Info XXXX O R
>>
startxref
115000
%%EOF
```

17032

20001 — /Prev 101000

20002 — startxref

IMAGE PROCESSING APPARATUS AND CONTROL METHOD THEREFOR

This application is a divisional application of application Ser. No. 09/788,409, now allowed, filed Feb. 21, 2001 now U.S. Pat. No. 6,982,811, which is incorporated herein by reference.

FIELD OF THE INVENTION

The present invention relates to an image processing apparatus capable of forming an image file having a plurality of pages from input image data and a control method therefor.

BACKGROUND OF THE INVENTION

In recent years, a technique of connecting an image scanner to a computer network, scanning an original with the scanner to read the image on the original, and sending the obtained image data to the computer network as an image file has been proposed.

In transmitting image data by such an image scanner, the user selects a transmission protocol and resolution, monochrome or color mode, format, and transmission destination of the image to be transmitted from the operation section.

Examples of the transmission protocol are Simple Mail Transfer Protocol (to be referred to as SMTP hereinafter), File Transfer Protocol (to be referred to as FTP hereinafter), NetWare, and Server Message Block Protocol (to be referred to as SMB hereinafter).

The resolution of an image is defined by resolutions in the main scanning and sub-scanning directions, and for example, dot per inch (to be referred to as dpi hereinafter) is used as a unit. More specifically, when 200 dpi×100 dpi is designated, the resolution in the main scanning direction is 200 dpi, and that in the sub-scanning direction is 100 dpi.

When a monochrome image is to be acquired by scanning, for example, the single page tag image file format (to be referred to as S-TIFF hereinafter), multiple page tag image file format (to be referred to as M-TIFF hereinafter), or portable document format (to be referred to as PDF hereinafter) developed by Adobe is designated as an image format.

When a color image is to be acquired by scanning, for example, the Joint Photographic Experts Group Format (to be referred to as JPEG hereinafter) or PDF is designated. The S-TIFF and JPEG form a file from the image of one original. The M-TIFF and PDF form a file from the images of a plurality of originals.

The expression of a transmission destination changes depending on the transmission protocol. A transmission destination for SMTP means an e-mail address, and that for FTP, NetWare, or SMB means a server name and a user name, password, and directory name on the server. The name of a file to be transmitted can also be added.

In such an image scanner, when one file is to be formed from a plurality of pages, as in the M-TIFF or PDF, for example, the image memory capacity may be short. In addition, when the user inputs an interrupt instruction or the like, processing is incompletely ended for an image file which is being created for an original image read so far, so the image file cannot be used.

The reason for this is as follows. In the M-TIFF or PDF, to, e.g., designate and display an arbitrary page, an offset value is added to the end of each page, and information for determining the file is added to the end of the final page. If the processing is interrupted, such information cannot be written, and an incomplete file which cannot be processed by an application compatible to M-TIFF or PDF is formed.

SUMMARY OF THE INVENTION

It is an object of the present invention to provide an image processing apparatus for solving the above problem.

It is another object of the present invention to provide an image processing apparatus which can make a file processible by application software even when image formation processing based on input image data is interrupted.

It is still another object of the present invention to provide an image processing apparatus which can form an appropriately divided multiple page file from image data obtained by reading images on a plurality of originals.

It is still another object of the present invention to provide an image processing apparatus which can link a plurality of arbitrary image data into one file.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 7 to 14 and 24 to 29 are views for explaining the formats of files formed in the second embodiment;

FIGS. 17 to 20 are views for explaining the format of a file formed in the second embodiment;

DETAILED DESCRIPTION OF THE PREFERRED EMBODIMENTS

First Embodiment

Embodiments of the present invention will be described below in detail with reference to the accompanying drawings.

Figure 1:
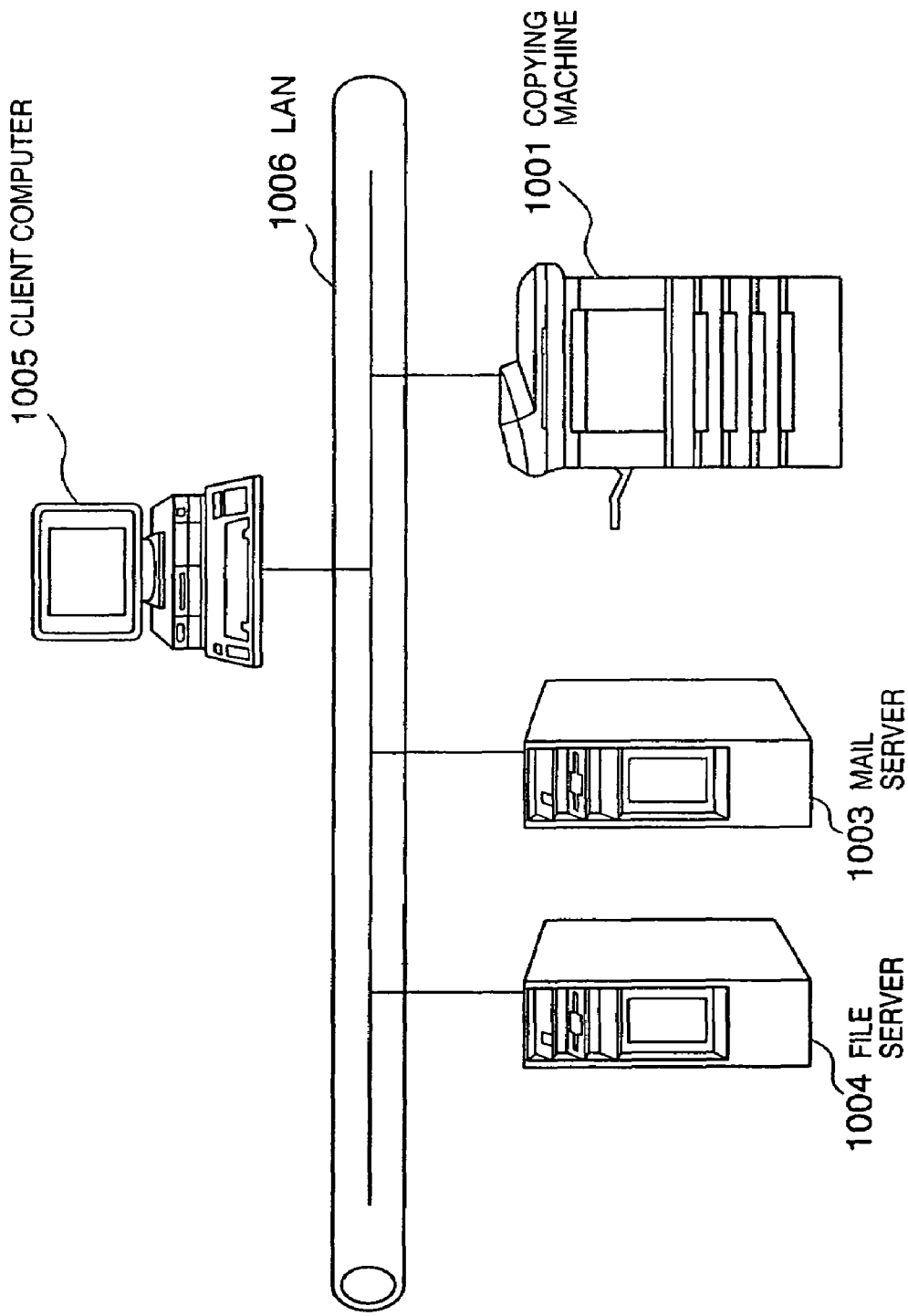
FIG. 1 is a view showing the arrangement of a system connected to a copying machine according to an embodiment of the present invention.

FIG. 1 is a view showing the arrangement of a network system using a copying machine according to an embodiment of the present invention.

A copying machine 1001 has not only a normal copying function of reading a plurality of originals and printing the images on printing paper but also a function of transmitting the read original images to another device connected to a local area network (to be referred to as a LAN hereinafter) 1006 such as Ethernet developed by Xerox Corp. through a network interface.

A mail server 1003 for e-mail and a file server 1004 which stores various files are computers for storing data and the like sent from the copying machine 1001. A client computer 1005 is a computer connected to the mail server 1003 and file server 1004 to acquire or display data. The LAN 1006 is a network to which the copying machine 1001, mail server 1003, file server 1004, client computer 1005, and the like are connected. The mail server 1003 corresponds to a so-called SMTP server or POP server, and the file-server 1004 corresponds to a so-called FTP server, NetWare server, or SMB server.

Although FIG. 1 illustrates only the single mail server 1003, file server 1004, and client computer 1005, a plurality of mail servers, file servers, and client computers may be connected to one network. Additionally, one apparatus can be commonly used as the mail server 1003 and file server 1004.

Figure 2:
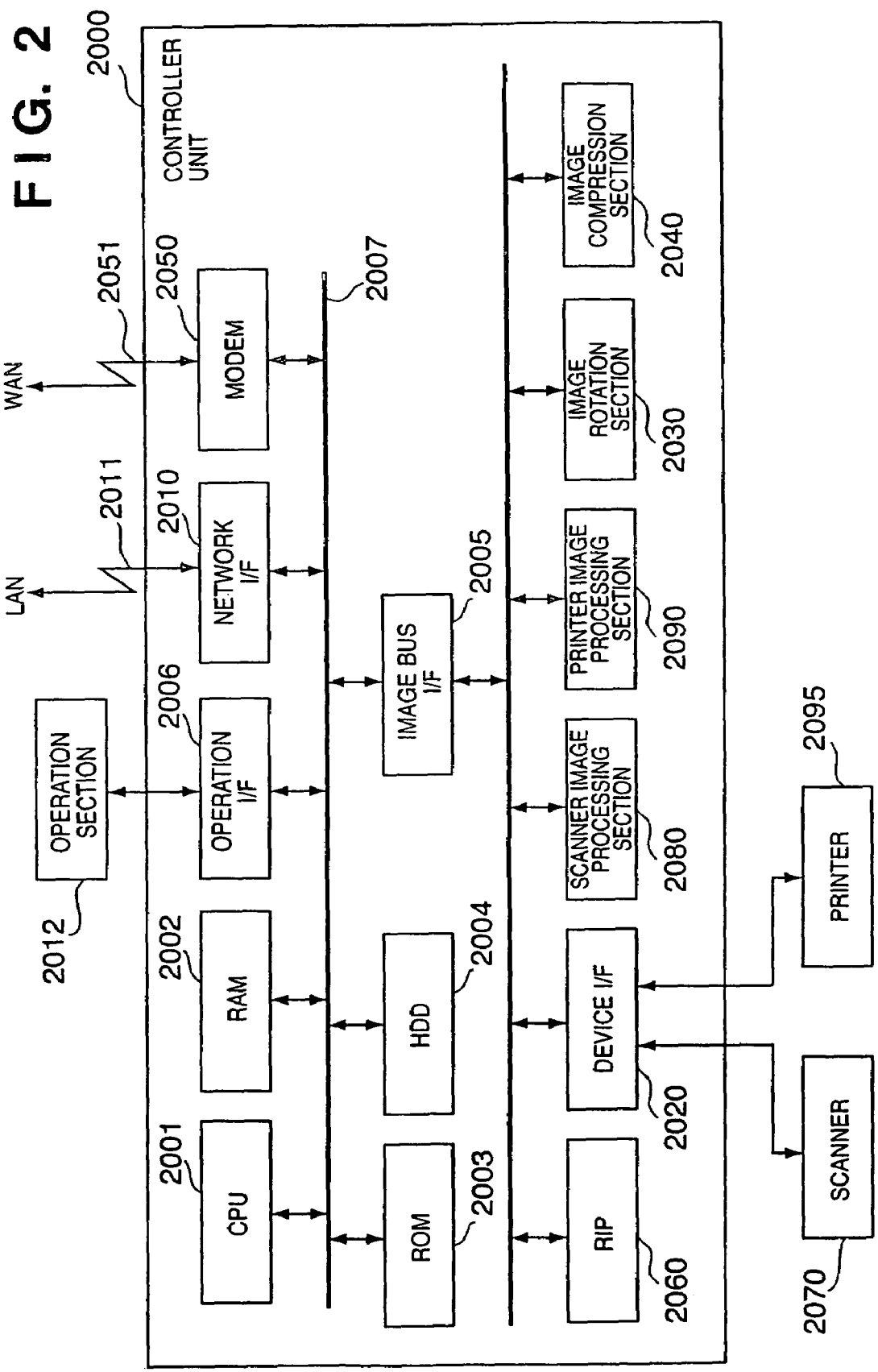
FIG. 2 is a block diagram showing the schematic arrangement of the copying machine according to the embodiment of the present invention.

FIG. 2 is a system block diagram of this embodiment, which shows the arrangement of a controller unit arranged in the copying machine 1001. A controller unit 2000 is connected to a scanner 2070 serving as an image input device and printer 2095 serving as an image output device and also connected to a LAN 2011 and public line (WAN) 2051 to input/output image information or device information.

A CPU 2001 is a controller for controlling the whole system. A RAM 2002 is a system work memory for operation of the CPU 2001 and is also used as an image memory for temporarily storing image data. A ROM 2003 is a boot ROM which stores the boot program of the system. An HDD 2004 is a hard disk drive for storing system software, image data, and the like in a hard disk. An operation section I/F 2006 is an interface section to an operation section (UI) 2012 having a touch panel or display section. The operation section I/F 2006 outputs display data to be displayed on the operation section 2012 to the operation section 2012 or transmits to the CPU 2001 information input from the operation section 2012 by the system user. A network I/F 2010 is connected to the LAN 2011 to input/output information. A modem 2050 is connected to the public line 2051 to input/output information. The above devices are arranged on a system bus 2007. An image bus I/F 2005 is a bus bridge which connects the system bus 2007 to an image bus 2008 for transferring image data at a high speed and converts the data structure. The image bus 2008 is formed from, e.g., a PCI bus or IEEE1394. The above devices are arranged on the image bus 2008. A raster image processor (RIP) 2060 bitmaps a PDL (Page Description Language) to a bitmap image. A device I/F section 2020 connects the scanner 2070 and printer 2095 as image input/output devices to the controller unit 2000 to synchronously or asynchronously convert image data. A scanner image processing section 2080 corrects, processes, and edits input image data from the scanner 2070. A printer image processing section 2090 performs correction and resolution conversion corresponding to the printer for print output image data to be output to the printer 2095. An image rotation section 2030 rotates image data. An image compression section 2040 executes compression/expansion processing by JPEG for multilevel image data and by JBIG scheme, MMR encoding, or MH encoding for binary image data. The scanner 2070 optically scans and reads the image of an original conveyed from an ADF (Auto Document Feeder) one by one or placed on an original table under the open ADF and generates electronic image data. The printer 2095 prints an image based on input image data on printing paper.

Figure 3:
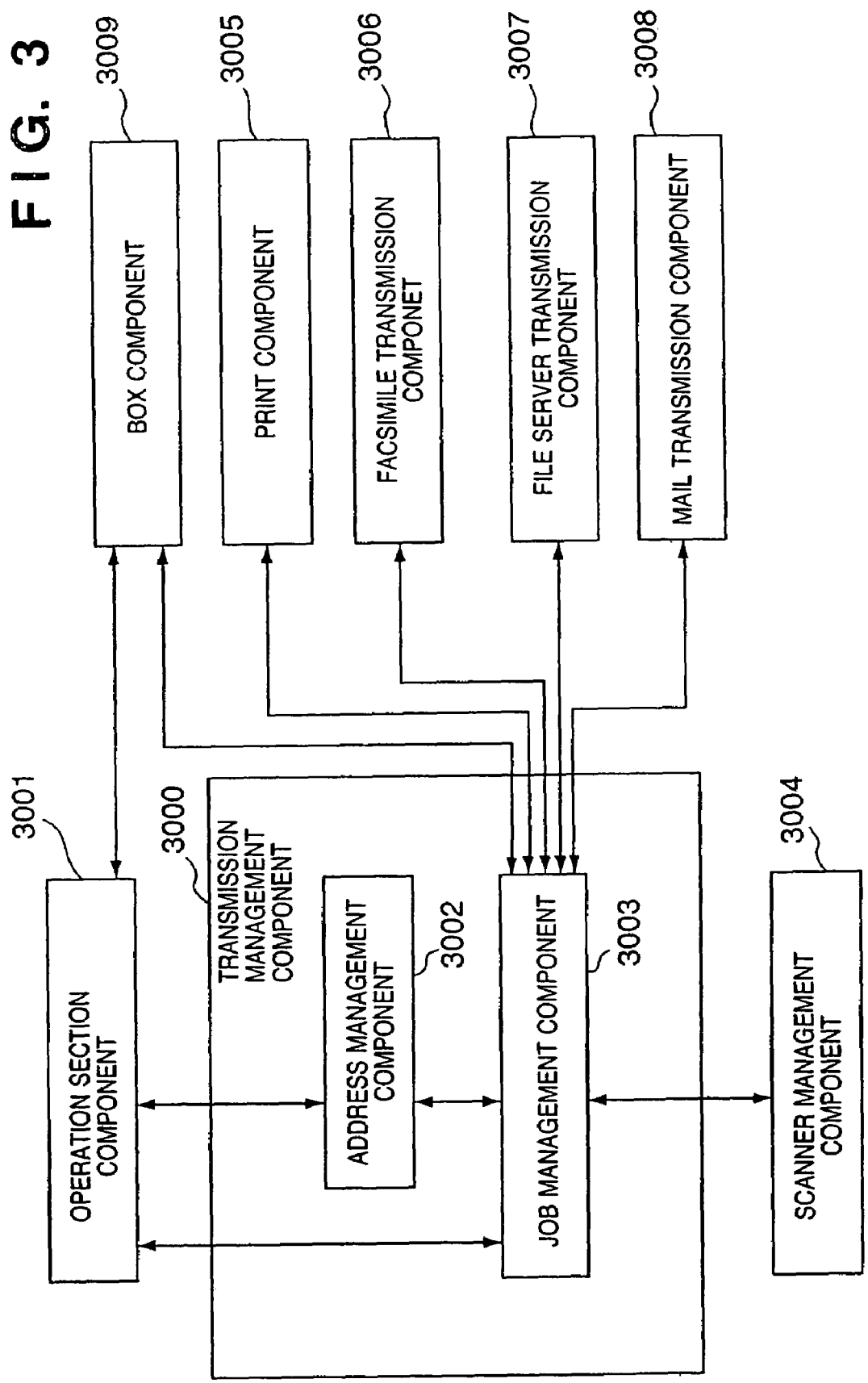
FIG. 3 is a block diagram showing a software configuration for controlling operation of the copying machine according to the embodiment of the present invention.

FIG. 3 is a block diagram showing a software configuration for implementing the transmission function of this embodiment. These software components are stored in the ROM 2003 and/or HDD 2004 in the controller unit 2000 and executed by the CPU 2001.

An operation section component 3001 is related to control of the operation section 2012 and acquires a data transmission protocol or the format and transmission destination of a transmission image by detecting a user instruction based on touch key operation on the operation section 2012.

A transmission management component 3000 can instruct a scanner management component 3004 to read an original and an address management component 3002 to acquire address information in accordance with a processing instruction such as the data transmission protocol or the format and transmission destination of the transmission image acquired by the operation section component 3001, and transmit or store the read image data or image data selected from a Box area provided in the HDD 2004 in accordance with a designation by the operation section 2012 to or in the printer 2095, a facsimile apparatus connected to the public line 2051, the file server/mail server connected to the LAN 1006 (2011), or a Box area provided in the HDD 2004 by issuing a transmission processing instruction to a print component 3005, facsimile transmission component 3006, file server transmission component 3007, mail transmission component 3008, or Box component 3009. Especially, the file server transmission component 3007 and mail transmission component 3008 can transmit image data to the file server/mail server 1004 using four protocols: FTP, NetWare, SMB, and SMTP. The transmission management component 3000 is constructed by the address management component 3002 and a job management component 3003 which controls jobs between itself and the scanner management component 3004 and other transmission components.

<File Format>

Figure 4:
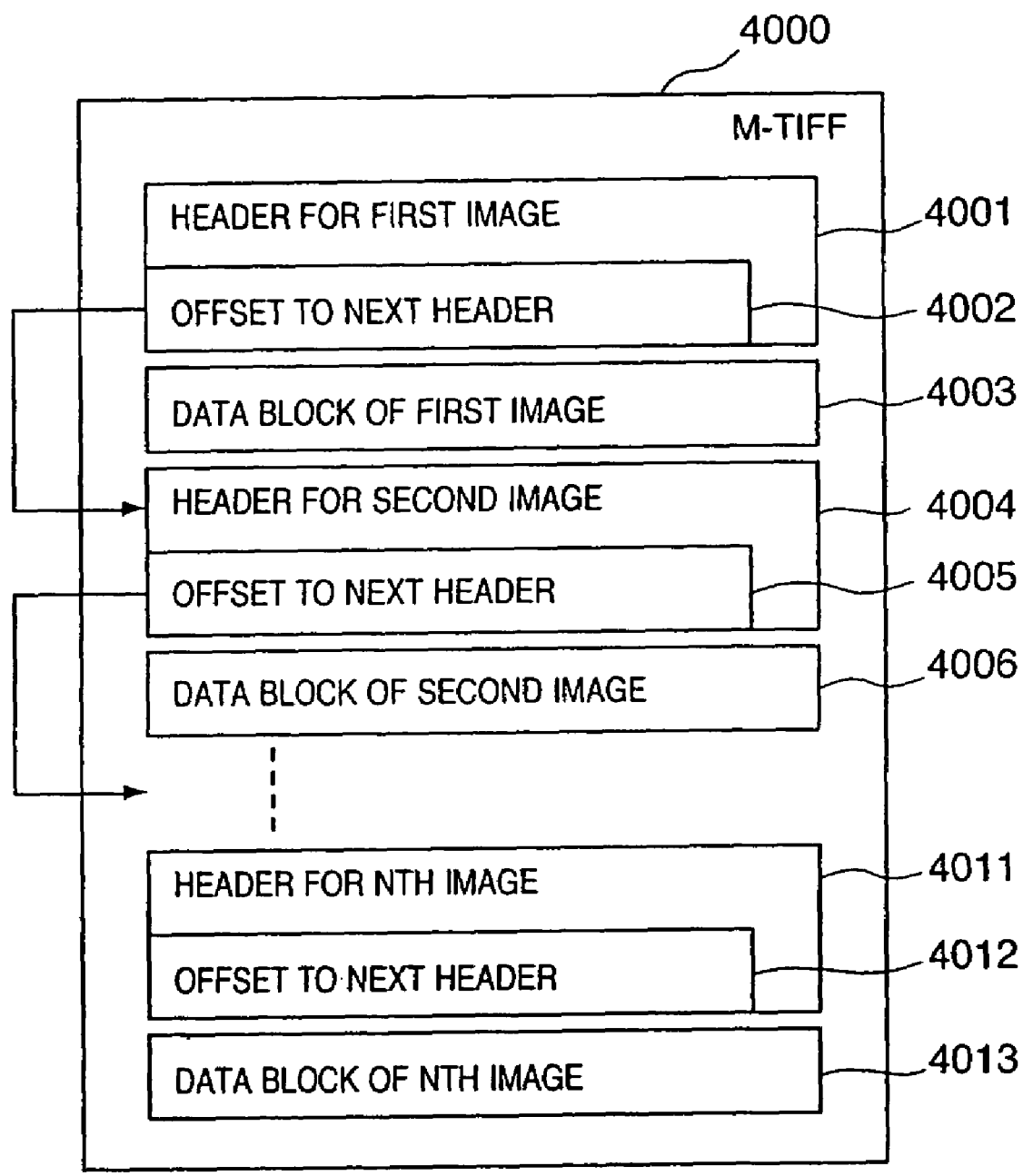
FIG. 4 is a view showing the format of an M-TIFF file.

FIG. 4 is a schematic view of an M-TIFF format in this embodiment. This data format is used by processing in the file server transmission component 3007 and mail transmission component 3008.

As for the data format structure of an M-TIFF file 4000, a header and a corresponding data block form one unit, and a plurality of such units are arranged in an order of a header 4001 for the first image data and a data block 4003 of the first image data, a header 4004 for the second image data and a data block 4006 of the second image data, and so on. For example, as the format of N image data, the first image compressed by, e.g., MMR is arranged in the data block 4003 of the first image data, and pieces of attribute information including the resolution and compression scheme of the first image and an offset 4002 for identifying the presence/absence of the next header data are arranged in the header 4001 for the first image data. The second image compressed by MMR is arranged in the data block 4006 of the second image data, and pieces of attribute information including the resolution and compression scheme of the second image and an offset 4005 for identifying the presence/absence of the next header data are arranged in the header 4004 for the second image data. This format continues to the last image, and "0" is stored in the header for the last Nth image as an offset to the next header, thereby identifying that this is the last image, and one file is completed here.

Figure 5:
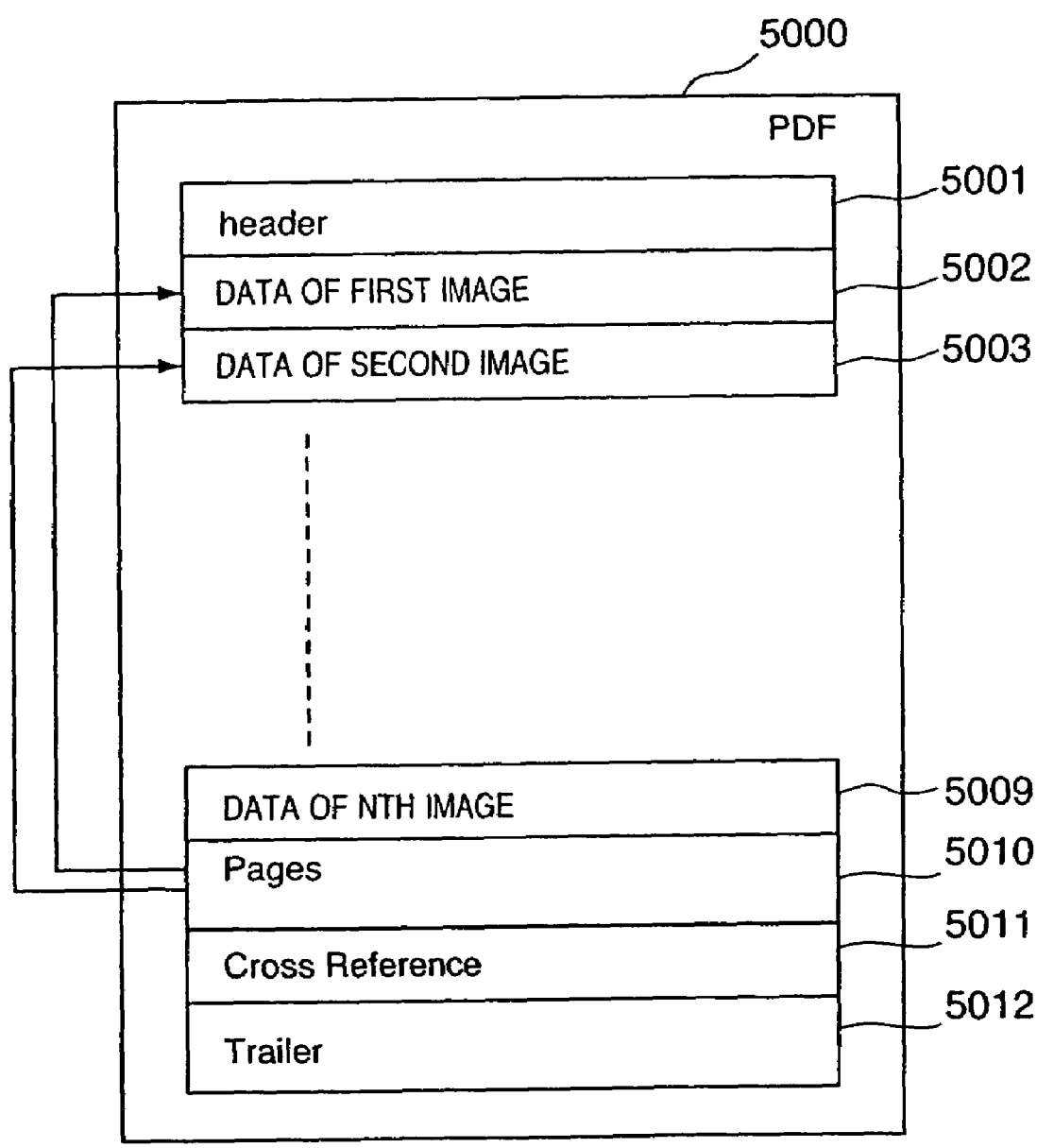
FIG. 5 is a view showing the format of a PDF file.

FIG. 5 is a schematic view of a PDF format in this embodiment. This data format is used by processing in the file server transmission component 3007 and mail transmission component 3008.

The data format structure of a PDF file 5000 has a header 5001, data 5002 of the first image, data 5003 of the second image, . . . data 5009 of the Nth image, Pages 5010, Cross Reference 5011, and Trailer 5012. The header 5001 is permanently generated. The Trailer 5012 has the position information or the like of the Cross Reference 5011. The data 5002 of the first image is formed from the first image data and pieces of attribute information including the resolution and compression scheme. The data 5003 of the second image is also formed from the second image data and pieces of attribute information including the resolution and compression scheme. The first data 5002, second data 5003, and the like are assigned object numbers for uniquely specifying the data in the PDF. The object numbers are described in the Pages 5010. All object numbers used in the PDF file 5000 and offset values represented by the object numbers in the PDF are described in the Cross Reference 5011.

Figure 15:
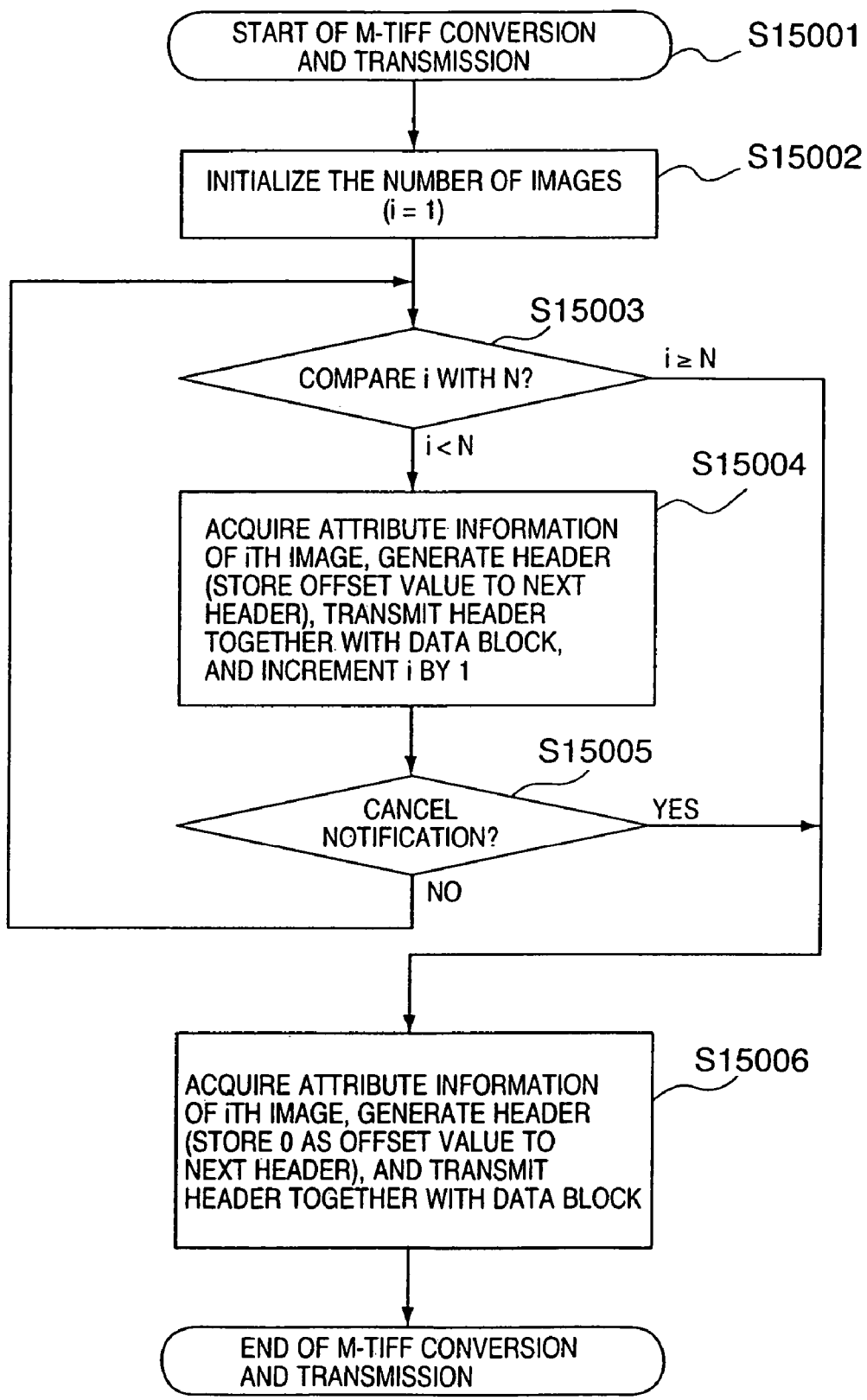
Figure 16:
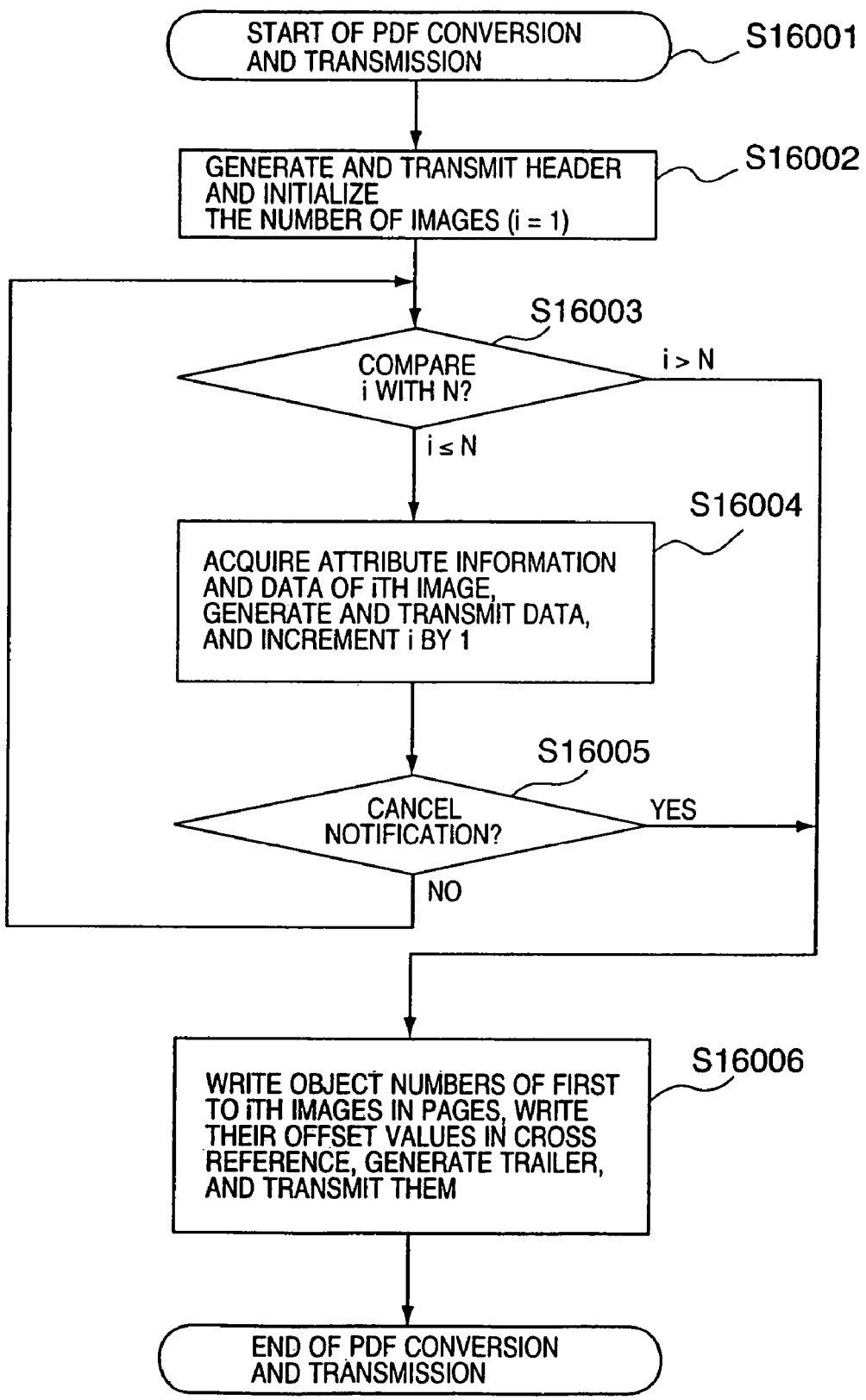

The file formats shown in FIGS. 4 and 5 are applied to file conversion in the flow charts of FIGS. 15 and 16.

<File Transmission>

Operation of the copying machine 1001 in transmitting a multiple page file as shown in FIG. 4 or 5 will be described next.

Figure 6:
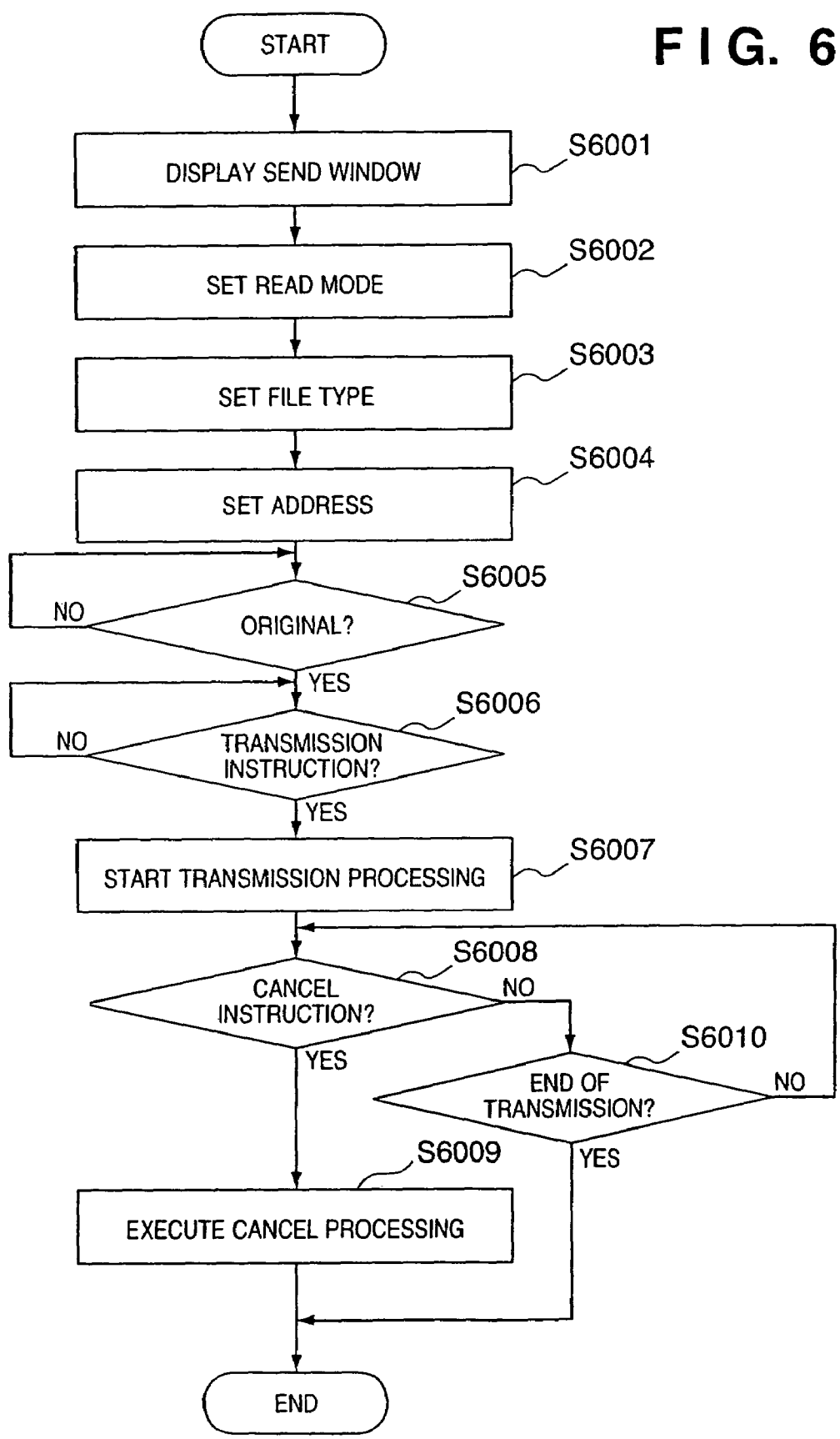
FIGS. 6, 15, and 16 are flow charts showing processing procedures according to the first embodiment.

FIG. 6 is a flow chart showing the operation procedure of file transmission. This flow chart shows the flow of processing controlled by the CPU 2001 on the basis of a program stored in the ROM 2003 and/or HDD 2004.

Figure 7:
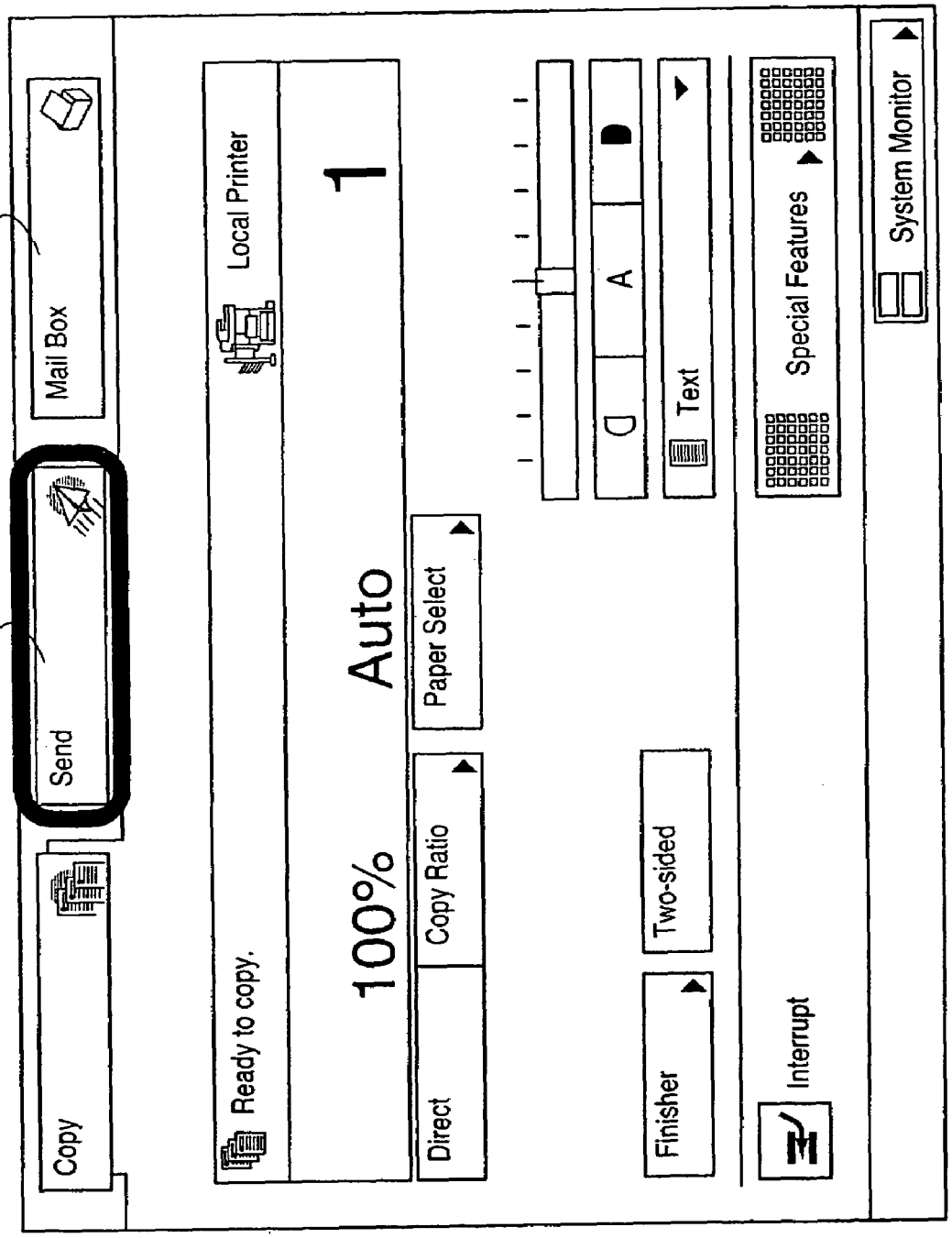

In step S6001, a Send window for making various designations for transmission is displayed by touching a [Send] key A1 in the display shown in FIG. 7 as the basic window (standby window) of the touch panel section in the operation section 2012.

Figure 9:
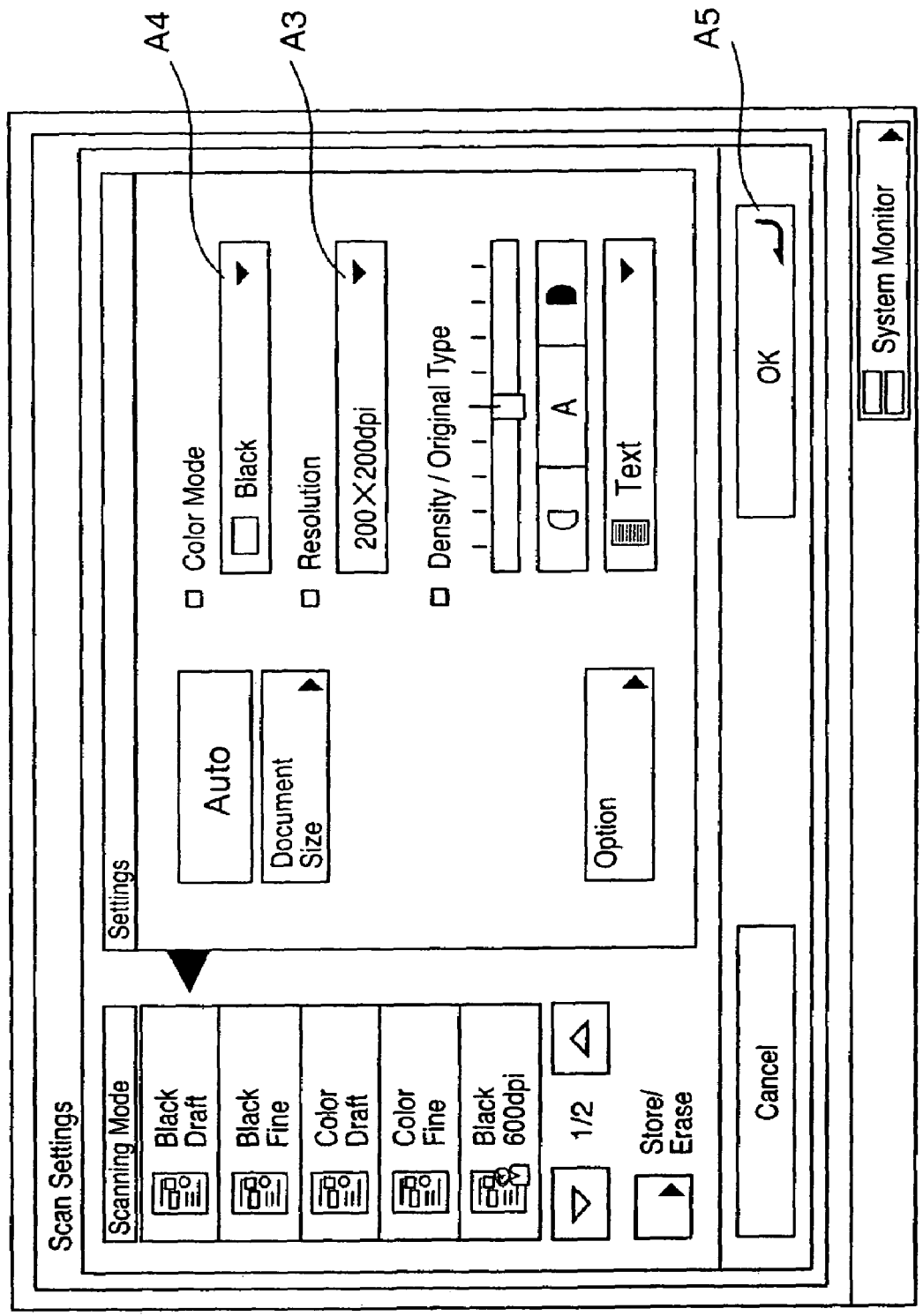

To set the read mode in step S6002, a Scan Setting window shown in FIG. 9 is displayed by pressing a [Scan Settings] key A2 in the Send window. Whether the original is to be read as a monochrome image or color image is designated by a [Color Mode] key A4, and the read resolution of the image is designated by a [Resolution] key A3, thereby setting the read mode. The Send window is displayed again by pressing an [OK] key A5. The read mode need not always be set at this time and can be set anytime before a read instruction.

Figure 10:
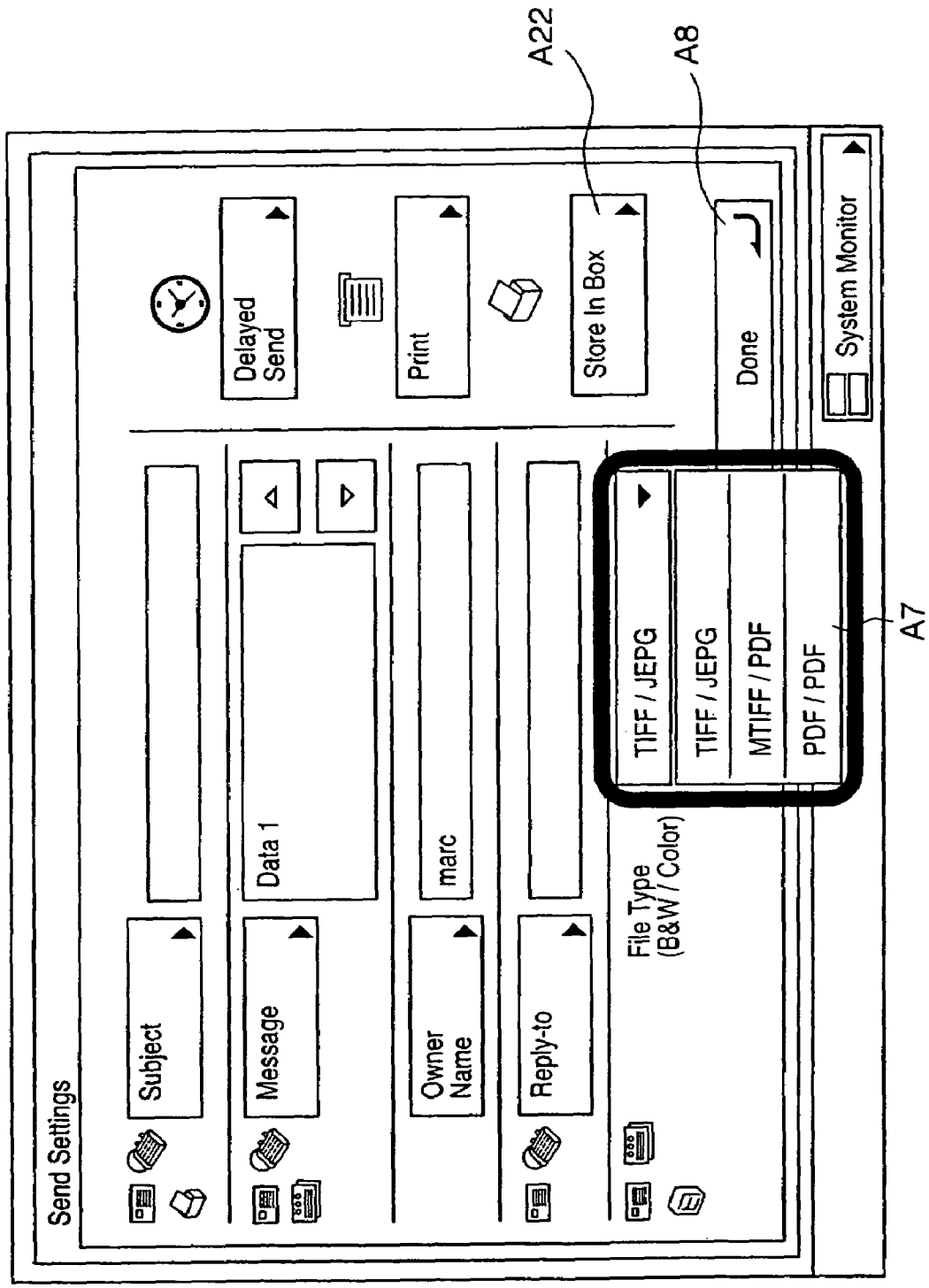

To set the file type in step S6003, a [Send Settings] key A6 in the Send window is pressed to display a Send Settings window in FIG. 10. To designate the file format of image data to be transmitted, a desired file format (image format) is selected from a list by a [File Type] key A7. For a monochrome image, S-TIFF, M-TIFF, or PDF can be selected. For a color image, JPEG or PDF can be selected. In this embodiment, since a format which converts a plurality of originals into one file is used for transmission, M-TIFF or PDF is selected for a monochrome image, and PDF is selected for a color image. When the file format is selected, a [Done] key A8 is pressed to display the Send window again. The file type need not always be set at this time and can be set anytime before a read instruction.

Figure 11:
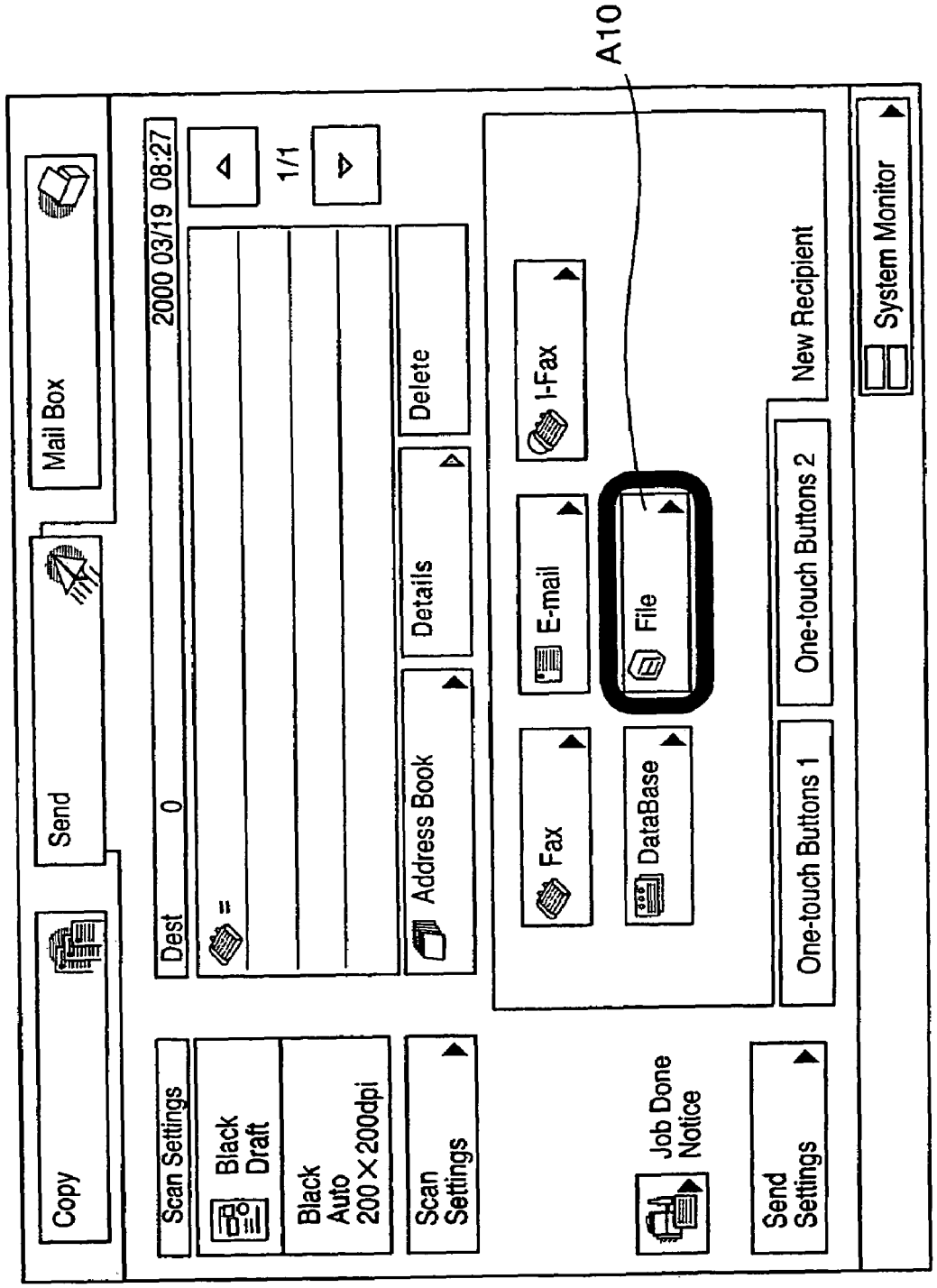
Figure 12:
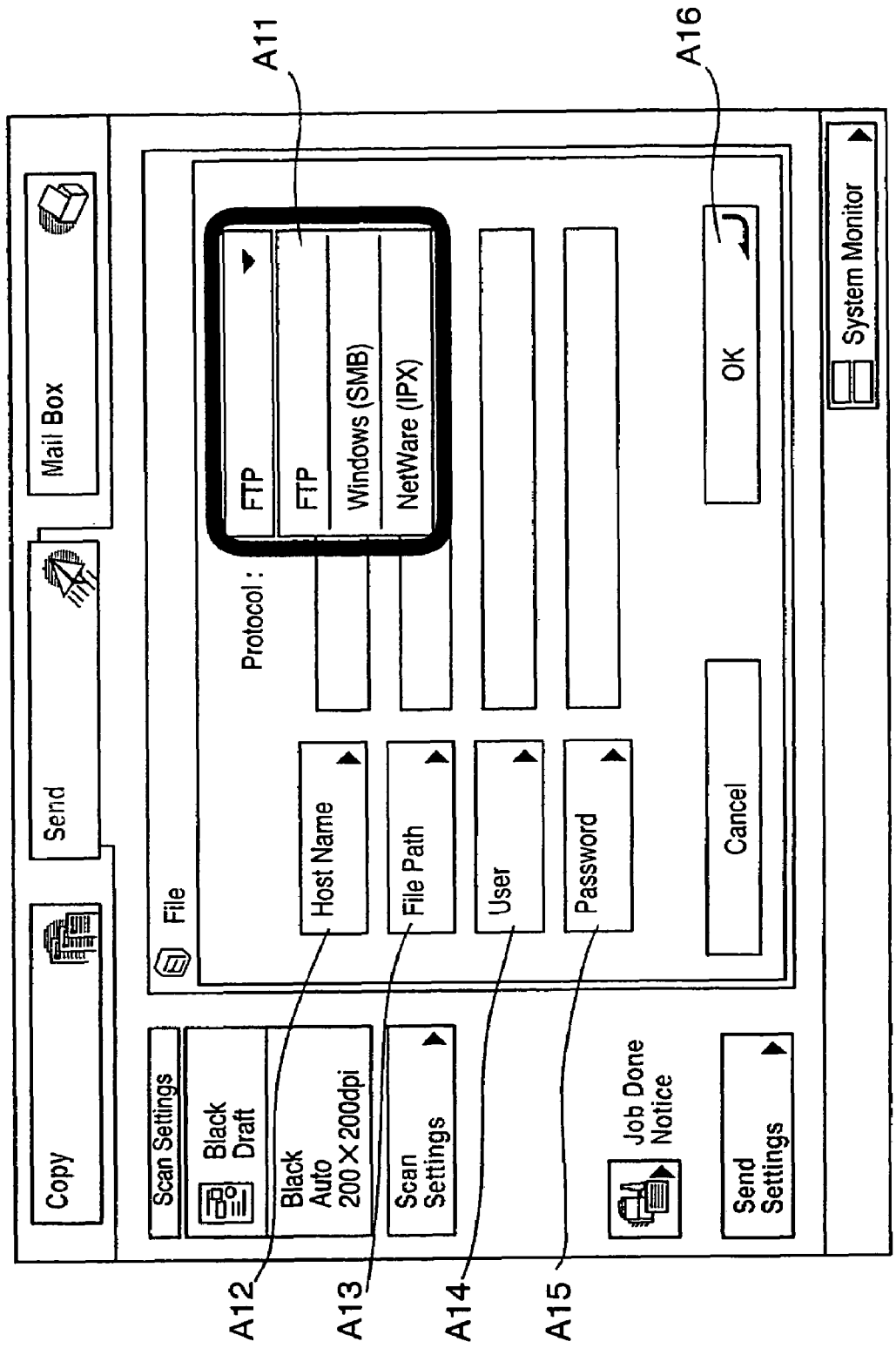

An address for file transmission is set in step S6004. If the desired address is already registered in Address Book or One-touch Buttons 1 or 2, the address is selected therefrom. If the address is not registered, a [New Recipient] key A9 is pressed to switch the window to the display shown in FIG. 11 and then designate the desired address type (in this case,

[File] is designated to store the file in a specific user folder in the file server 1004 on the LAN 1006). Subsequently, in accordance with the display shown in FIG. 12, a protocol to be used for file transmission, the computer name of the file server 1004, the path (directory) to the file storage destination file, the user name, and a password are input by a [Protocol] key A11, [Host Name] key A12, [File Path] key A13, [User] key A14, and [Password] key A15, respectively. When all inputs for transmission destination settings are ended, and an [OK] key A16 is pressed, the window returns to the Send window.

Thus, various settings for transmission are ended. These setting contents are put together by the operation section component 3001 and transmitted to the job management component 3003. The job management component 3003 processes these pieces of information as one job. The operation section component 3001 also makes the operation section 2012 display the contents such that the user of the copying machine 1001 can selectively cancel them.

The job management component 3003 notifies the scanner management component 3004 of the above setting contents and performs setting for reading. When a plurality of (N) originals are set on the ADF (Auto Documents Feeder) of the copying machine 1001, or an original is placed on the original table under the open ADF in step S6005, and then the start button in the operation section 2012 is pressed in step S6006, scan reading of the original is started in accordance with the above settings. In reading the originals set on the ADF, the originals are conveyed and sequentially read one by one. In reading the original placed on the original table, the original is exchanged by the user. Hence, for the last original, operation for instructing it is performed on the operation section 2012.

When a read instruction is input in step S6006, the job management component 3003 notifies the scanner management component 3004 of the resolution and the monochrome or color read mode. The scanner management component 3004 causes the scanner 2070 to operate in the designated monochrome or color read mode at the designated resolution to sequentially read the plurality of originals and obtain input images, and causes the scanner image processing section 2080 to correct, process, and edit the input image data. In addition, the input images are rotated using the image rotation section 2030. In the monochrome read mode, the image data are compressed by two-dimensional encoding (to be referred to as MMR hereinafter) complying with the ITU-T recommendations, converted into a plurality of S-TIFF files in units of pages, and stored in the HDD 2004. In the color read mode, the image data are compressed by the image compression section 2040 by JPEG, converted into a plurality of JPEG files in units of pages, and stored in the HDD 2004. When storage is ended, the scanner management component 3004 notifies the job management component 3003 of the locations of the input images in the HDD 2004.

Next, since the transmission protocol is FTP, NetWare, or SMB, the job management component 3003 selects the file server transmission component 3007 as the job processing destination and notifies the file server transmission component 3007 of pieces of information including the locations and format of the input images in the HDD 2004, the transmission protocol, and the transmission destination. After that, when the user performs cancel operation in step S6008, the operation section component 3001 notifies the job management component 3003 of cancel of the job, the job management component 3003 notifies the file server transmission component 3007 of cancel of the job, and cancel processing is executed in step S6009 as will be described later.

Figure 8:
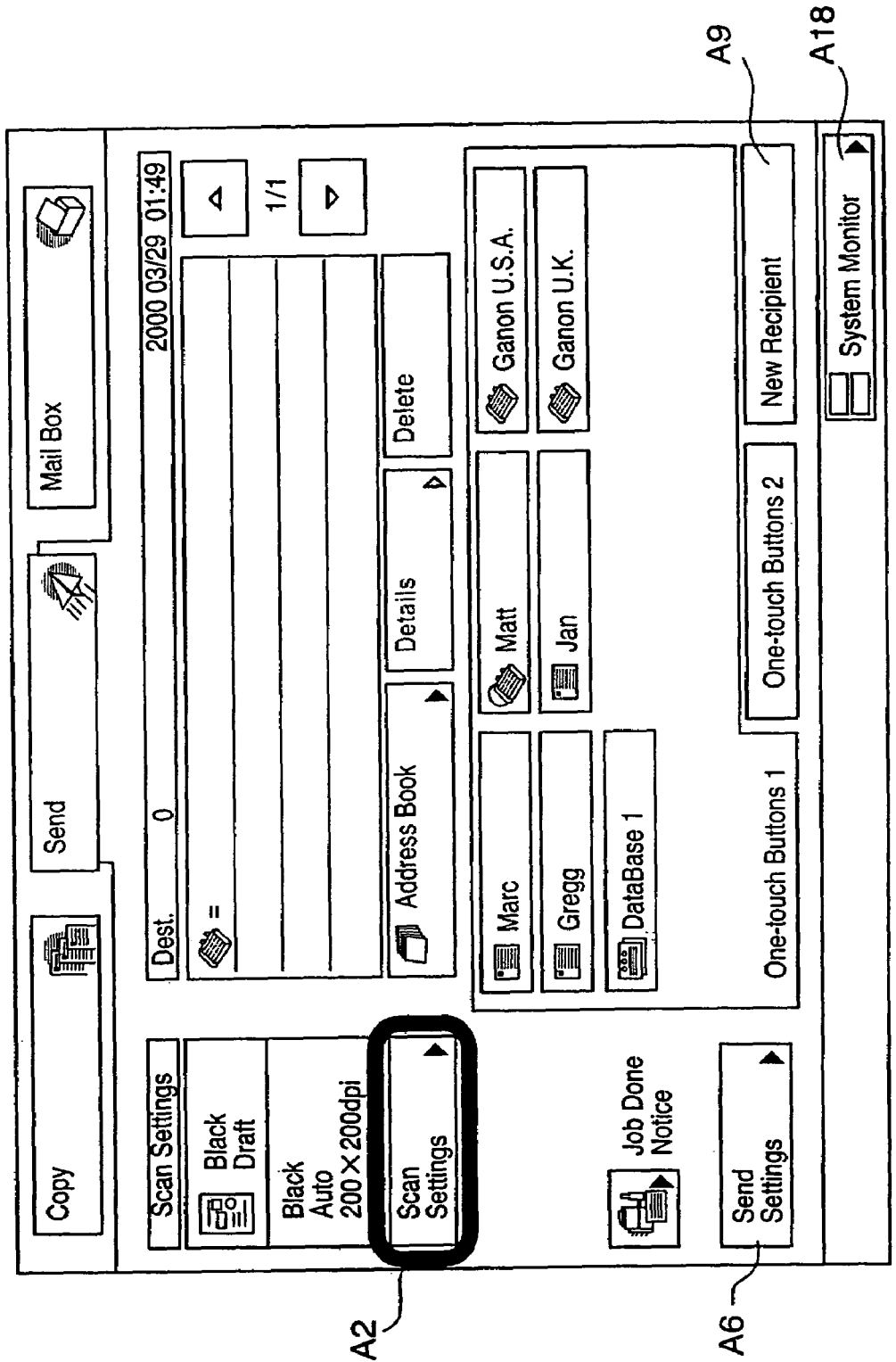
Figure 13:
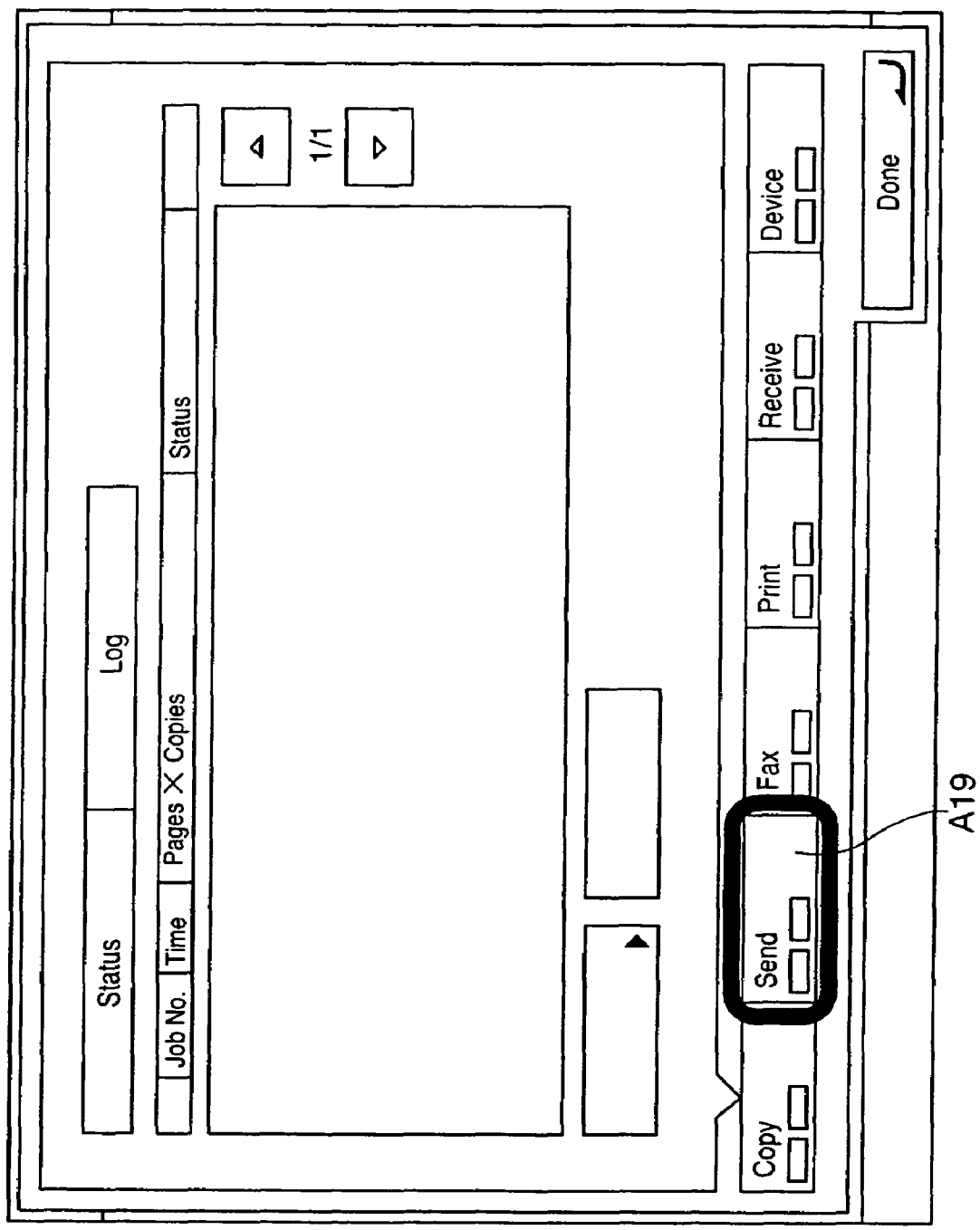

To cancel transmission midway, a [System Monitor] key A18 is pressed on the Send window shown in FIG. 8 to display a System Monitor window shown in FIG. 13. In this case, since the job of the Send function is to be canceled, a [Send] key A19 is pressed to display the job status window of the Send function shown in FIG. 14. "Sending" represents that transmission processing currently progresses, and "Waiting" represents a transmission standby state.

Assume that the job for which transmission is instructed is a job A20. The job A20 is pressed, and then, a [Cancel] key A21 is pressed, thereby canceling the transmission job A20. At this time, a dialog for confirming whether the user really wants to cancel the job may be displayed to prevent any operation error.

The file server transmission component 3007 reads out the received protocol, determines the protocol to be used through the network I/F 2010, and accesses the file server/mail server 1004 as the received transmission destination. Using the transmitted server name and user name on the server, the file server transmission component 3007 logs in to the designated file server/mail server 1004 and designates the directory where a transmitted image file is to be stored. The name (e.g., date/time+extension corresponding to data format=20000222.tif) of a file to be transmitted is automatically generated and designated from the file creation date/time and the designated data format.

If the received format is M-TIFF, the file server transmission component 3007 transmits the S-TIFF images input to the HDD 2004 to the file server/mail server 1004 on the LAN 1006 while converting them into an M-TIFF file. When the transmission protocol is SMTP, these processing operations are performed by the mail transmission component 3008.

<File Transmission and Conversion>

The flow of processing of converting image data obtained by reading images on originals into an M-TIFF file and of transmitting it will be described next with reference to the flow chart shown in FIG. 15. This flow chart shows the flow of processing controlled by the CPU 2001 on the basis of a program stored in the ROM 2003 and/or HDD 2004.

When conversion into an M-TIFF file and transmission are started in step S15001 in FIG. 15, a variable i representing the number of originals to be transmitted is initialized to 1 in step S15002. The total number N of the originals and the variable i are compared in step S15003. If i<N, the flow advances to step S15004.

The pieces of attribute information of the first original image input to the HDD 2004 are acquired in step S15004 to generate the first header 4001. The offset 4002 to the next header can be calculated by reading the image size in the attribute information of the first image. When the first header 4001 is generated, the first header 4001 is transmitted to the file server/mail server 1004. The first data block 4003 means the first image portion input to the HDD 2004. The data block 4003 is read out from the HDD 2004 and transmitted to the file server/mail server 1004. The variable i is incremented by one. Next, it is checked in step S15005 whether a cancel notification is received. More specifically, when the first data block is completely transmitted, it is checked whether a cancel notification for the job is received. If NO in step S15005, the same operation as described above is repeated for the second and subsequent images. When the Mth (M<N) data block is completely transmitted, and a cancel notification for that job has been received at that time, the offset value to the (M+1)th header has already been stored in the Mth header as an offset to the next header. Hence, in step S15006, the (M+1)th header is generated by substituting "0" into the offset to the next header in the (M+1)th header and is transmitted, and the (M+1)th data block is transmitted, thus completing transmission of the job.

If the received format is PDF, the file server transmission component 3007 must transmit the S-TIFF images input to the HDD 2004 to the file server/mail server 1004 while converting them into a PDF file. FIG. 16 is a flow chart showing the flow-of conversion into a PDF file and transmission of it in this embodiment. This flow chart shows the flow of processing controlled by the CPU 2001 on the basis of a program stored in the ROM 2003 and/or HDD 2004. Conversion into a PDF file and transmission are started in step S16001.

First, the header 5001 is generated and transmitted, and the variable i representing the number of originals to be transmitted is initialized to 1 in step S16002. The total number N of the originals and the variable i are compared in step S16003. If i≦N, the flow advances to step S16004. The first data 5002 is generated by reading out first image and pieces of attribute information of that image input to the HDD 2004, and is transmitted, and the variable i for counting the number of originals is incremented by one in step S16004.

It is checked next in step S16005 whether a cancel notification is received. If NO in step S16005, the same operation as described above is repeated for the second and subsequent images.

If the Mth (M<N) data is transmitted, and a cancel notification for that job has been received at that time, the Pages 5010 which describes object numbers of the first to Mth images is generated and transmitted, the Cross Reference 5011 which describes all the object numbers used in the PDF file 5000 and offset values represented by the object numbers in the PDF is generated and transmitted, and the Trailer 5012 is generated and transmitted in step S15006, thereby ending transmission of the job.

In the above embodiment, a case wherein a job is canceled by a user instruction has been described. This also applies to a case wherein a job is canceled due to an error or the like in the apparatus without intervening the user.

According to the above embodiment, when an interrupt of image data transmission is instructed during transmission, the interrupt instruction is received, and image data transmitted until the interrupt are re-converted as one image data, thereby completing data transmission. This allows smooth image processing convenient for the user without creating any abnormal file.

Second Embodiment

In the above-described first embodiment, in transmitting a plurality of originals as one file having attribute information of each page, even when transmission is canceled midway, the file is completed such that image data that are already transmitted can be processed as a normal file on the receiving side. This prevents the memory area from being wasted for transmission of an abnormal incomplete file and also allows re-transmission from the interrupted portion.

In the second embodiment to be described below, for example, when the work area for the Send function set in a RAM 2002 of a copying machine 1001 has an upper limit, in the PDF transmission mode, an offset value representing the storage place of image data to be transmitted and its attribute information must be described in a Cross Reference 5011 together with the object number of the image data. For this reason, the number of images that can be converted into the PDF format and transmitted is limited. To prevent this, in the second embodiment to be described below, after the Cross Reference 5011 is generated and transmitted within the allowable range of the work area, and a Trailer 5012 is transmitted to complete one PDF file, such an expression is added that a header and subsequent image data are additionally written in the PDF file, another PDF file including a Cross Reference and Trailer related to the added image data is added, and the two PDF files are linked to express them as one PDF file, thereby preventing any limitation on the number of images that can be converted into the PDF format and transmitted.

This processing will be described below in detail.

The arrangements of the system and copying machine 1001 are the same as in FIGS. 1 to 3, and a detailed description thereof will be omitted.

Figure 17:
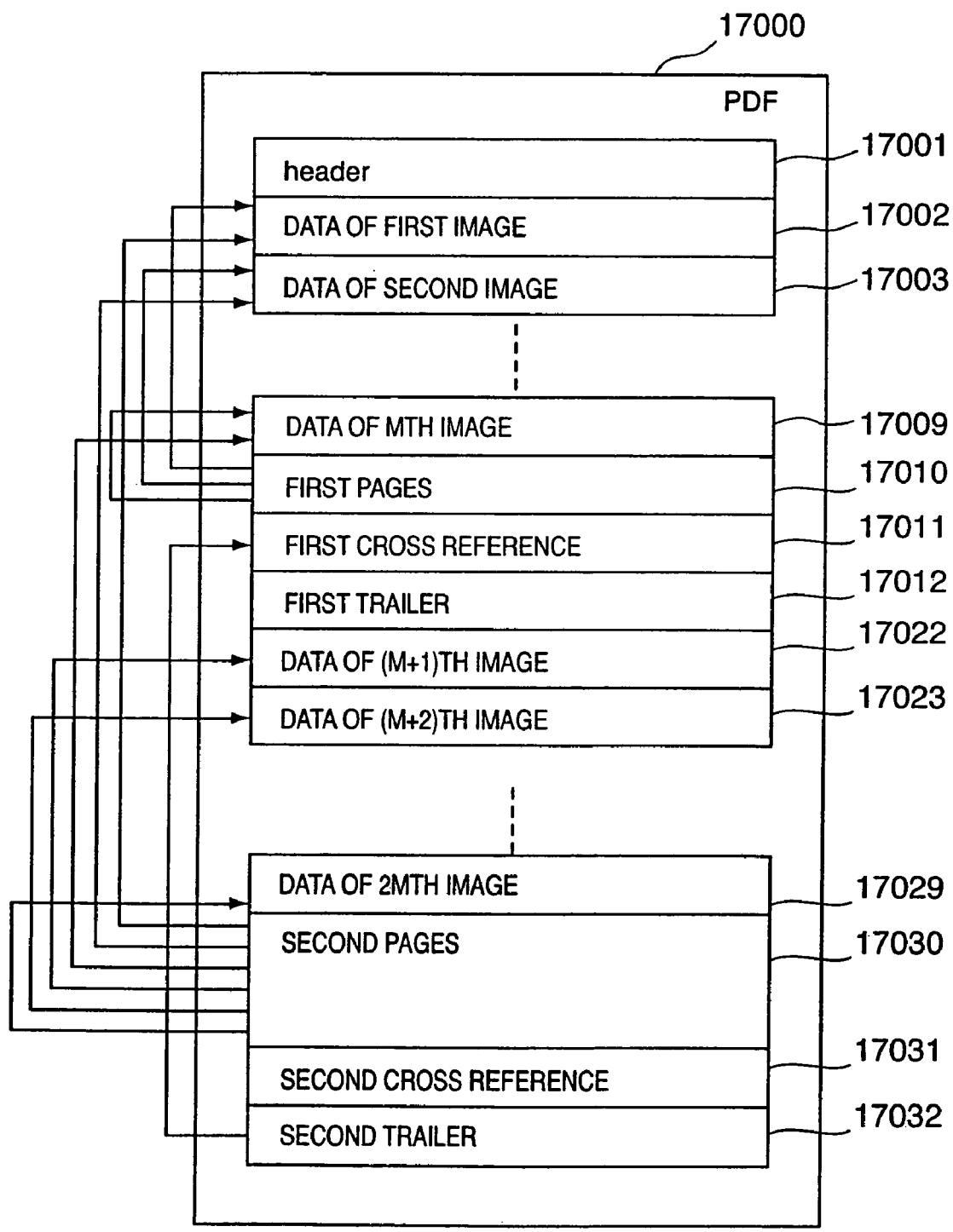

FIG. 17 is a view for explaining the schematic data format of a PDF file in this embodiment. In this embodiment, the upper limit number of scanned images that can be converted into one file is M. FIG. 17 shows a data format when the total number of images to be transmitted is 2M.

A file server transmission component 3007 (or mail transmission component 3008) creates a PDF file as shown in FIG. 17 from scanned image data. A PDF file 17000 has a header 17001, and then, data are continuously arranged in an order of a first data 17002, second data 17003, . . . and Mth data 17009 in correspondence with the upper limit number of image data. A first Pages 17010, first Cross Reference 17011, and first Trailer 17012 continue next to the Mth data 17009. Then, data are continuously arranged in an order of (M+1)th data 17022, (M+2)th data 17023, . . . , and 2Mth data 17029. Like the portion next to the Mth data 17009, a second Pages 17030, second Cross Reference 17031, and second Trailer 17032 continue next to the 2Mth data 17029.

Of these portions, the header 17001 can be permanently generated. The first data 17002 is formed from the first original image and pieces of attribute information including the resolution and compression scheme of the image. The second data 17003 is also formed from the second image and pieces of attribute information including the resolution and compression scheme of the image. The subsequent data have the same structure as described above. The Mth data 17009 is also formed from the Mth image and pieces of attribute information including the resolution and compression scheme of the image. The first data 17002, second data 17003, and the like are assigned object numbers which are unique in the PDF file 17000.

These object numbers are described in the first Pages 17010. All object numbers which have appeared before the first Cross Reference 17011 and pieces of position information represented by the object numbers are described in the first Cross Reference 17011. The position information of the first Cross Reference 17011 is described in the first Trailer 17012.

The (M+1)th data 17022 is formed from the (M+1)th image and pieces of attribute information including the resolution and compression scheme of the image. The (M+2)th data 17023 is also formed from the (M+2)th image and pieces of attribute information including the resolution and compression scheme of the image. The subsequent data have the same structure as described above. The 2Mth data 17029 is also formed from the 2Mth image and pieces of attribute information including the resolution and compression scheme of the image. The (M+1)th data 17022, (M+2)th data 17023, and the like are also assigned object numbers which are unique in the PDF file 17000.

The object numbers of the first image data 17001 to the 2Mth image data 17029 are described in the second Pages 17030. That the first Pages 17010 are updated by the second Pages 17030, the position information of the second Pages 17030, the object number of the (M+1) th data 17022, and the values of position information of all objects which have appeared from the (M+1)th data 17022 to the second Cross Reference 17031 are described in the second Cross Reference 17031.

The position information of the first Cross Reference 17011 and that of the second Cross Reference 17031 are described in the second Trailer 17032. With this structure, the side that has received this file can form one PDF file by adding pieces of information on which the first Pages, Cross Reference, and Trailer are reflected to the second Pages, Cross Reference, and Trailer and deleting the first Pages, Cross Reference, and Trailer. A complete PDF file also contains other elements, though they are irrelevant to this embodiment, and a detailed description and illustration thereof in FIG. 17 are omitted.

FIG. 18 is a view showing a detailed description example of the second Pages 17030. Referring to FIG. 18, the upper limit number M of convertible scanned images is 200, and the total number 2M of scanned images is 400. A row 18001 of "/Kids" describes the object numbers of the first to 2Mth image data 17001 to 17029. The object number of the first image data 17001 is "10 R", and the object number of the 2Mth image data 17029 is "23940 R". A row "/Count400" represents the number of object numbers of all images. This value is 2M=400.

FIG. 19 is a view showing a detailed description example of the second Cross Reference 17031 shown in FIG. 17. As in FIG. 18, the upper limit number M of convertible scanned images is 200, and the total number 2M of scanned images is 400. A row 19001 describes "21" representing that the first Pages 17010 is updated by the second Pages 17030. Next, the position of the second Pages is described in a row 19002, the object number (1200) of the (M+1)th data 17022 is described in a row 19003, and the position information of the (M+1)th data 17022 is described in a row 19004. From the row 19004, the values of position information of all object numbers which have appeared before the second Cross Reference 17031 are described.

FIG. 20 is a view showing a detailed description example of the second Trailer 17032 shown in FIG. 17. Referring to FIG. 20 as well, the upper limit number M of convertible scanned images is 200, and the total number 2M of scanned images is 400. In the second Trailer 17032, the position information of the immediately preceding (first) Cross Reference 17011 is described in a row 20001, and the position information of the second Cross Reference 17031 is described in a row 20002.

The flow in executing transmission processing according to the second embodiment in the copying machine of this embodiment will be sequentially described below.

Figure 21:
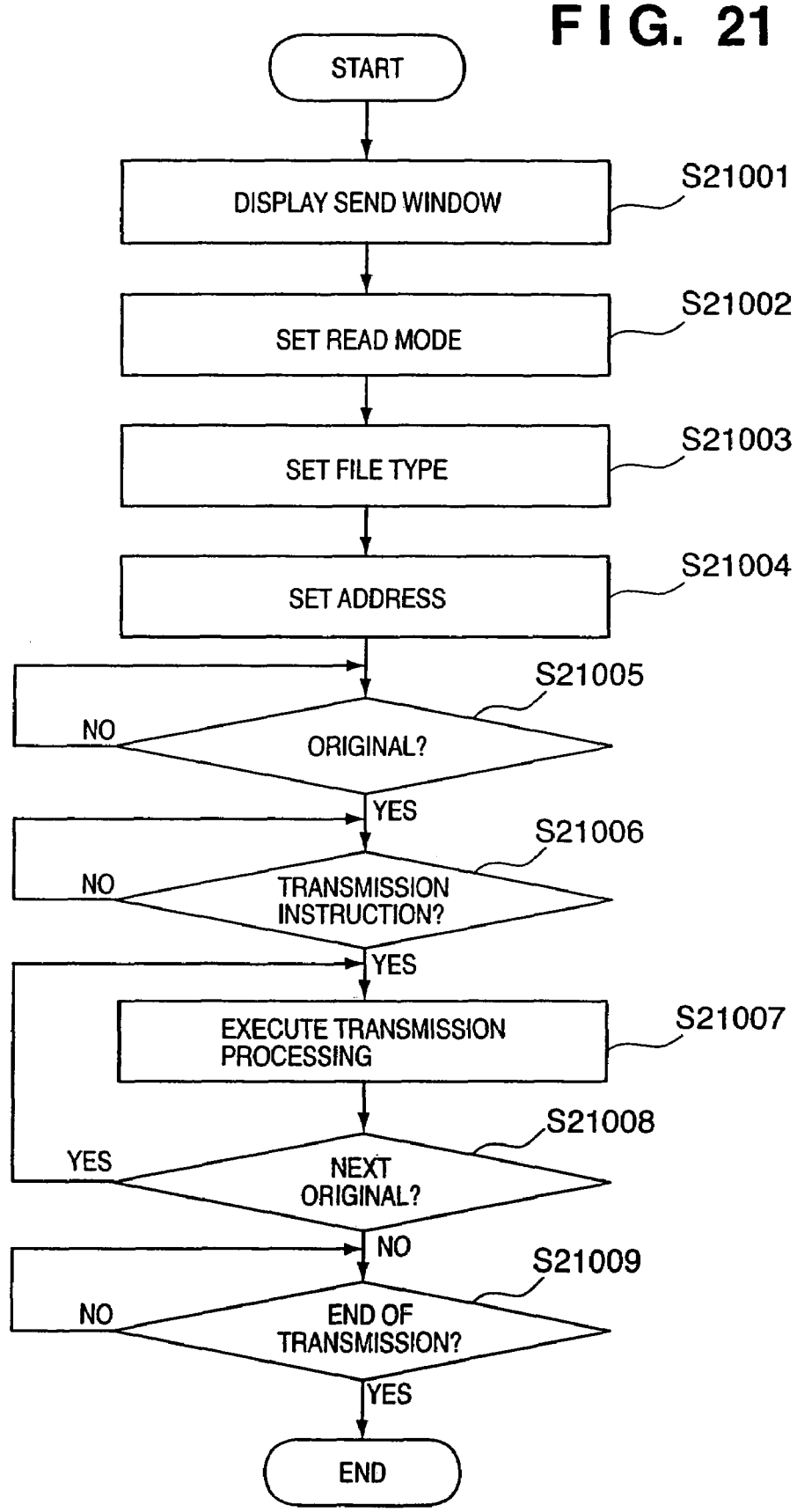
FIGS. 21 to 23 are flow charts showing processing procedures according to the second embodiment.

FIG. 21 is a flow chart showing the flow of processing procedure of the copying machine 1001 according to the second embodiment. This flow chart shows the flow of processing controlled by a CPU 2001 on the basis of a program stored in a ROM 2003 and/or HDD 2004.

Processes in step S21001 to S21006 are the same as the above-described processes in steps S6001 to S6006 in FIG. 6, and a detailed description thereof will be omitted.

In file type setting in step S21003, however, the PDF file is designated. Additionally, in steps S21005 and S21006, regardless of whether the originals are set in the ADF or placed on the original table, the originals are processed as a series of originals (originals which should be contained in a common file) until the final original is designated (the last bundle of originals when the ADF is used).

In step S21007, reading of the image of each original and transmission processing according to the procedure to be described later are started on the basis of contents set in steps S21001 to S21004. The processing is continued until the last original is determined in step S21008.

When it is determined that transmission is ended, the series of transmission processing operations are ended.

Figure 22:
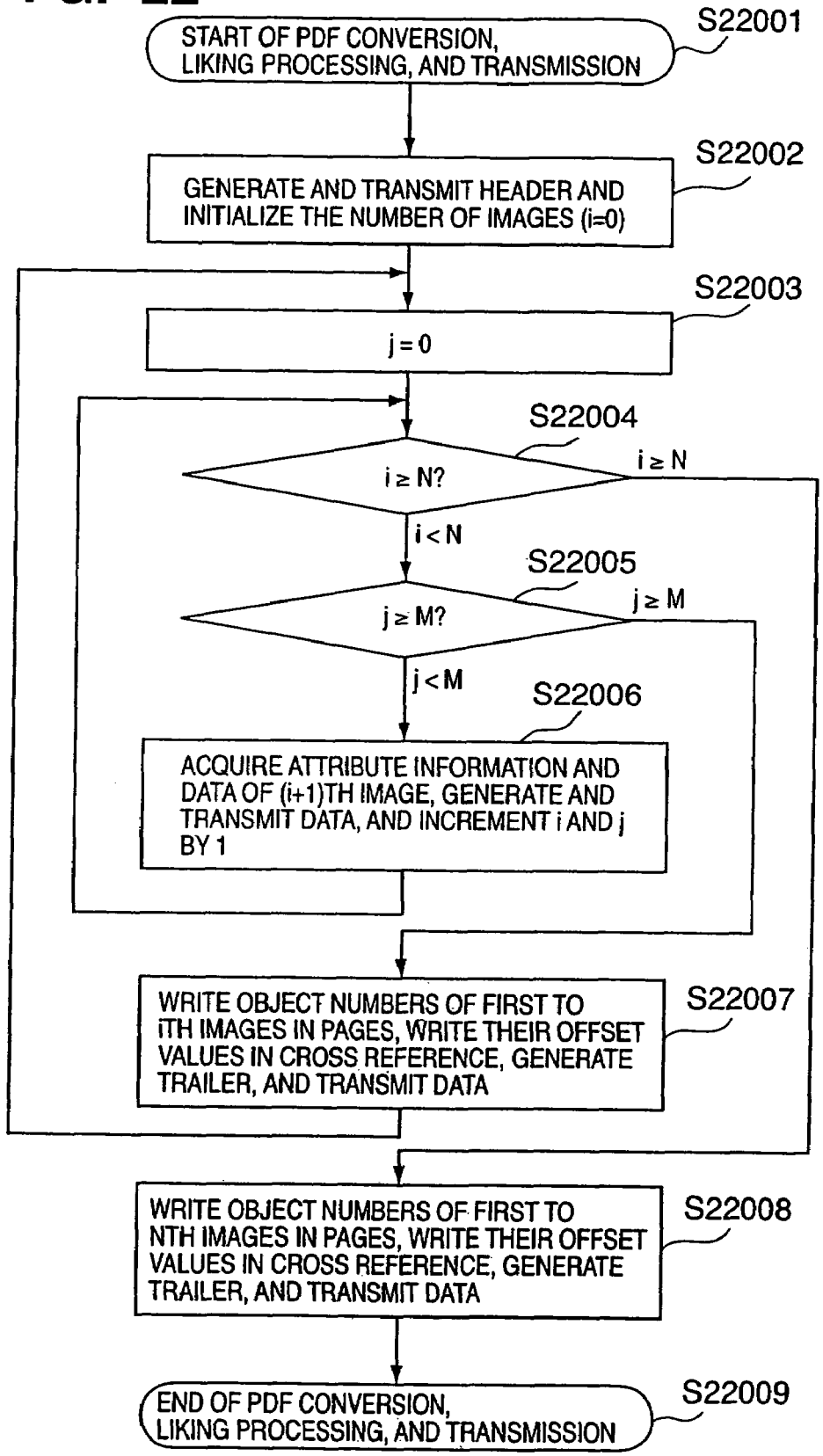

A series of processing operations related to creation and transmission of a PDF file will be described next with reference to the data structure shown in FIG. 17 and the flow chart shown in FIG. 22. Referring to FIG. 22, the upper limit number of pages of images that can be converted at a time is M, and the total number of pages of a series of images to be transmitted is N (N>M).

When creation and transmission processing of a PDF file are started in step S22001, the file server transmission component 3007 generates and transmits the header 17001 in step S22002 and initializes the variable i representing the number of transmitted images to 0.

Next, a variable j representing the number of converted images is initialized to 0 in step S22003.

The total number N of originals is compared with the variable i in step S22004. If the variable i is smaller than the number N, the flow advances to step S22005. If the variable i is equal to or larger than the number N, i.e., when all images are transmitted, the flow advances to step S22008.

The upper limit number M of images that can be converted at a time is compared with the variable j in step S22005. If the variable j is smaller than the number M, the flow advances to step S22006. If the variable j is equal to or larger than the number M, i.e., when the number of images reaches the upper limit, the flow advances to step S22007.

In step S22006, the attribute information and data of the ith original image are acquired, data is generated and transmitted, and the variables i and j are incremented by one. Then, the flow returns to step S22004.

When transmission of the first to Mth images is ended, in step S22007, the object numbers of the first data 17002 to the ith data 17009 are written in the first Pages 17010, pieces of position information of the object numbers are written in the first Cross Reference 17011, and the first Trailer 17012 is generated and transmitted. Then, the flow returns to step S22003.

When the processing in step S22007 is executed for the first time, the position information of the generated Cross Reference is stored. From processing for the nth (n is a natural number or 2 or more) time, the object numbers of the data of the first to (n×M)th images are described in the nth Pages. The nth Cross Reference sequentially describes that the (n−1)th Pages is updated by the nth Pages, the position information of the nth Pages, the object number of the ((n−1)×M+1)th data, and the values of position information of all objects that have appeared from the ((n−1)×M+1)th to ith data. In generating the nth Trailer, the position information of the preceding Cross Reference is written, and the position information of the newly generated Cross Reference is stored.

When transmission of the first to Nth images is ended, in step S22008, the object numbers of data of the first to Nth images are written in the Pages, that the Pages of the immediately preceding file block are updated by the newly generated Pages, the position information of the newly generated Pages, the object number of the (N−j)th data, and pieces of position information of all objects that have appeared from the (N−j) th data to the newly generated Cross Reference are written in the Cross Reference, and a Trailer in which the position information of the preceding Cross Reference and that of the newly generated Cross Reference are written is generated and transmitted. Then, the flow advances to step S22009.

In step S22009, conversion to the PDF file and transmission processing are ended.

In the above embodiment, the upper limit number of pages is used as a reference for division. However, the present invention is not limited to this, and the data amount (M bytes) of image data may be used.

In the above-described embodiment, a case wherein a PDF file is formed has been described. However, the present invention can also be applied as long as a file having a data format which puts a plurality of image data together into one file is to be created, and the same problem as described above is posed.

In this case as well, a plurality of file blocks are formed in accordance with the amount of original images with which a file can be formed, and transmitted with additional information representing the correlation between the blocks, and on the receiving side, the blocks are processed as a series of files on the basis of the additional information.

In the above-described embodiment, information capable of specifying an immediately preceding file block is added to second and subsequent blocks. However, information capable of specifying a succeeding file block may be added.

According to the above-described second embodiment, since information representing that information of Pages of an immediately preceding file block is updated by the current Pages is written in the second (final) Cross Reference, the side that has received this file can delete the previous Cross Reference or Pages, so the file to be finally formed can be compact and simple.

In addition, since each of divide files is segmented in units of pages and has a Cross Reference and pages, the divided files (files each having multiple pages) are completed as files by themselves. For this reason, the files can be processed as independent files depending on the application on the receiving side without writing pieces of information of the remaining divided files in the final Cross Reference and Pages and deleting the Cross Reference and Pages of each file, unlike the above embodiment. Hence, even in an environment where a large file cannot be processed, the respective files can be appropriately processed.

Third Embodiment

In the above embodiment, offset values, Cross Reference, Pages, and Trailer are controlled whereby a file whose processing is interrupted midway is completed at that time or a large quantity of image data is divisionally transmitted.

In the third embodiment to be described below, a plurality of arbitrary image data are selected, linked and reconverted into one file, and transmitted using the technique of controlling offset values and the like.

The procedure will be described below in detail.

Figure 23:
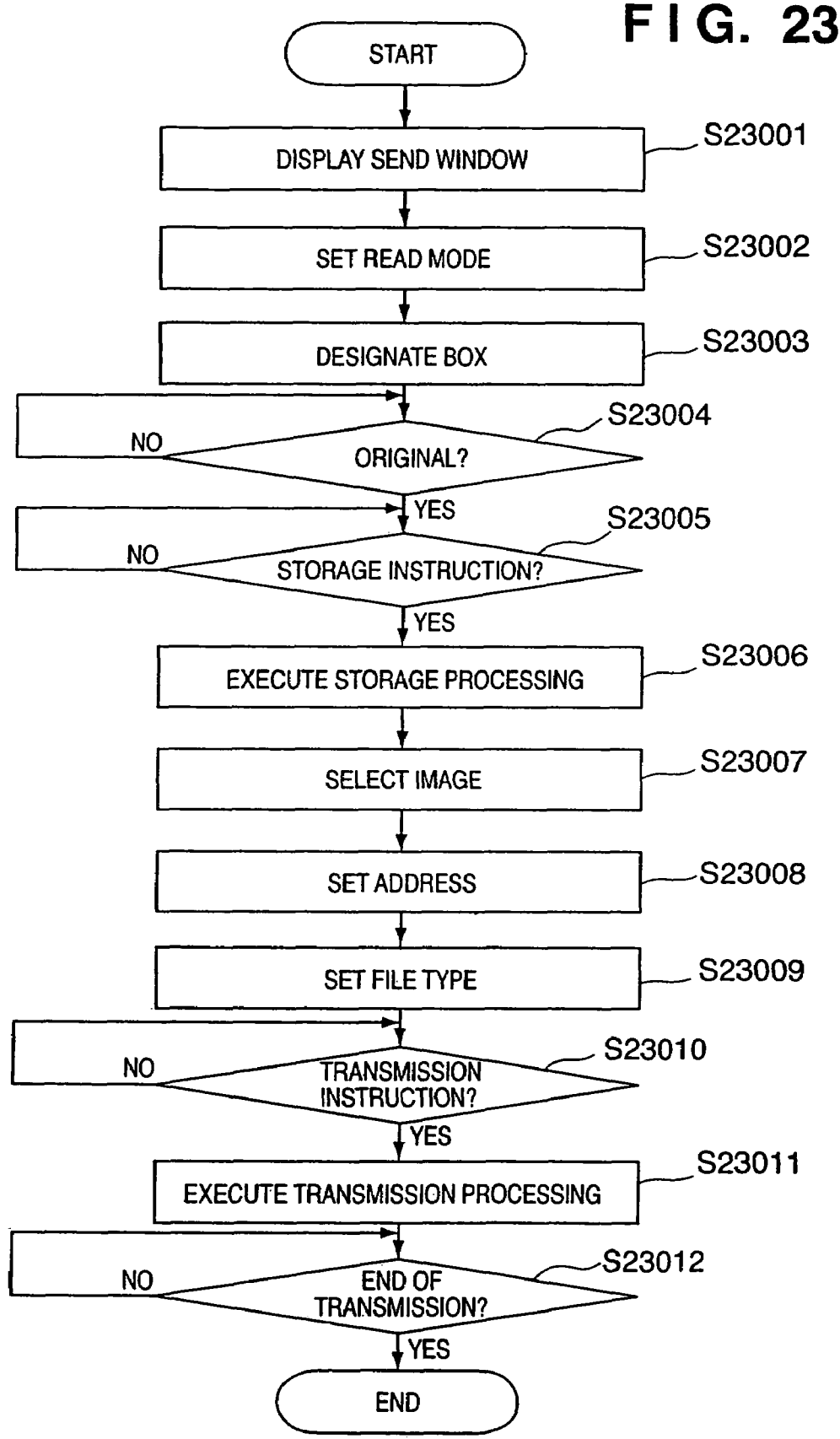

FIG. 23 is a flow chart showing the flow of operation procedure of a copying machine 1001 according to the third embodiment. This flow chart shows the flow of processing controlled by a CPU 2001 on the basis of a program stored in a ROM 2003 and/or HDD 2004.

In steps S23001 and S23002, the read mode is set as in the above described embodiments.

Figure 24:
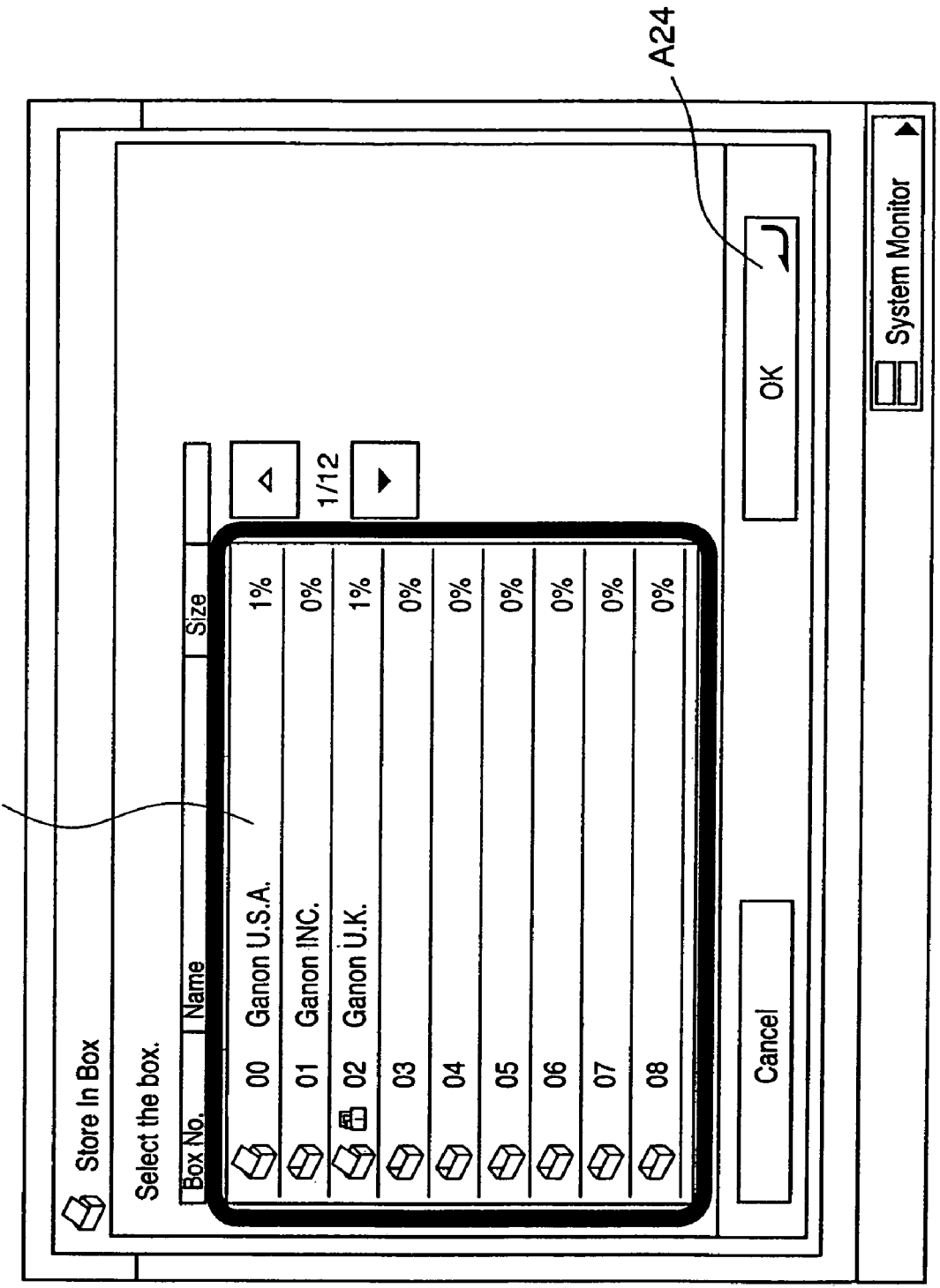

To do Box designation in step S23003, a [Store In Box] key A22 is pressed on the Send Settings window shown in FIG. 10 to display the Store In Box window shown FIG. 24.

In the copying machine 1001, the HDD 2004 is divided into a plurality of areas such that various kinds of image data can be stored. Individual divided storage destinations are called Boxes discriminated by Box numbers. Assume that a Box A23 with Box number 00 is selected. When an [OK] key A24 is pressed, the storage destination is set, and the window returns to the Send Settings window. Subsequently, a [Done] key A8 is pressed to return the window to the Send window.

When it is confirmed that an original is set in the ADF or on the original table in step S23004, and the start button on an operation section 2012 is pressed in step S23005, reading of the image on the original is started on the basis of the set contents. In step S23006, if the read image data is a monochrome image, it is stored in Box 00 as an S-TIFF file, and if the image data is a color image, it is stored as JPEG file. At this time, the read mode, i.e., color or monochrome, the image size, the number of pages, and the date/time of storage are also stored in correspondence with the image data. When storage is ended, a scanner management component 3004 notifies a job management component 3003 of the location of the stored image in the HDD 2004. The job management component 3003 notifies a Box component 3009 of the location of the stored image in the HDD 2004 and its Box number. The Box component 3009 stores, in the HDD 2004, the relationship between the location of the image stored in the HDD 2004 and the Box number for the image. A number of information related to a plurality of various image data stored at various times are stored in the Box component 3009 together with Box numbers. The image stored at this time is not limited to an image from a scanner 2070. An image from various input sources such as a network I/F 2010 or modem 2050 may also be stored.

The above processing can be executed anytime.

Figure 25:
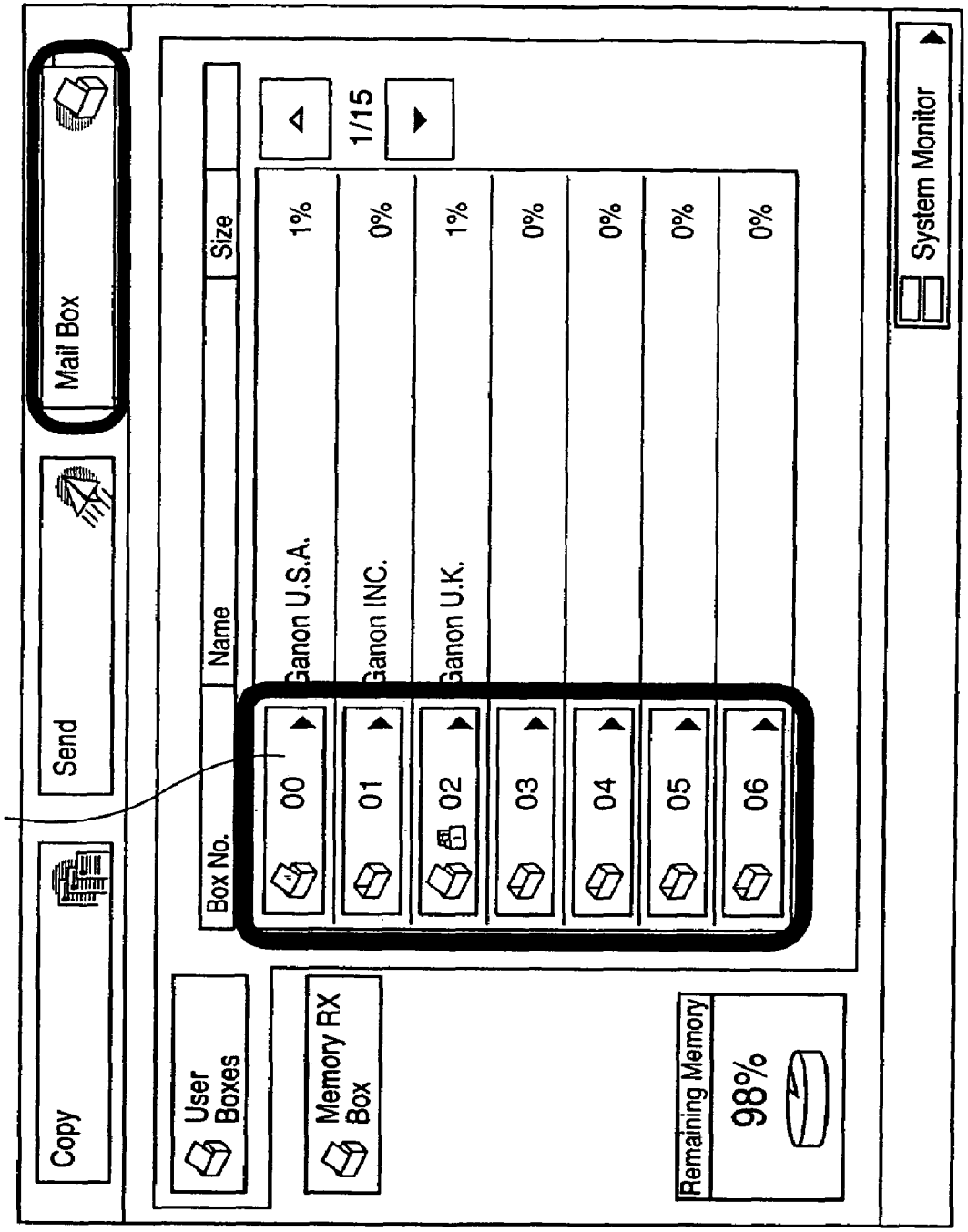
Figure 26:
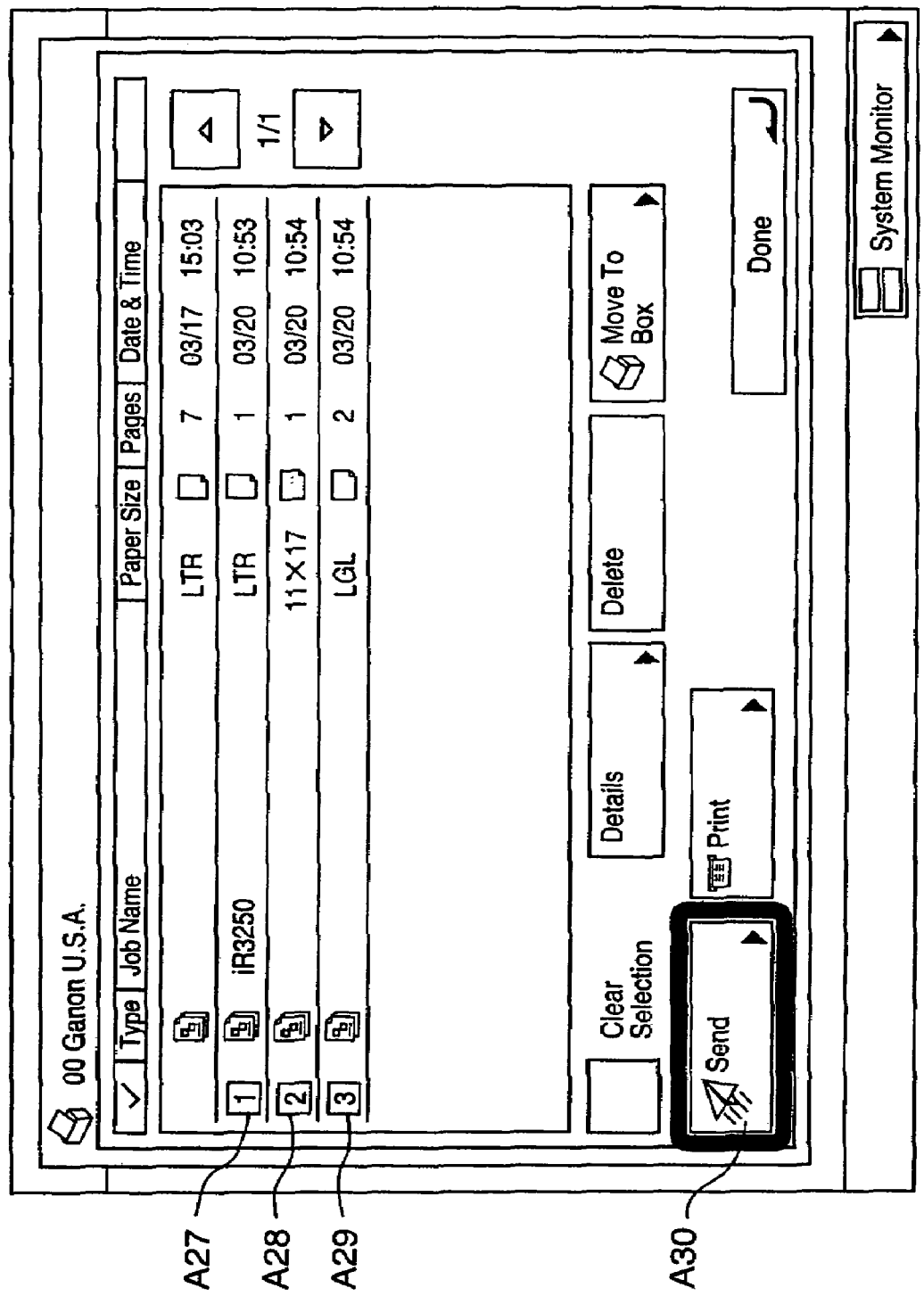

In step S23007, to select desired image data in the Box, a [Mail Box] key A25 is pressed on the basic window shown in FIG. 7 to display the Mail Box window shown in FIG. 25. In this case, to select a plurality of image data stored in Box 00, a key A26 is pressed on the Mail Box window to display the contents of Box 00. On the content check window of Box number 00 in FIG. 26 (this window is displayed on the basis of information obtained by inquiring an operation section component 3001), the user selects three image data A27, A28, and A29 in the order named as image data to be linked and transmitted with reference to the image sizes and storage dates/times. The operation section component 3001 stores the selected image data together with the order thereof, and the selected order is displayed at the left end (1 to 3).

Figure 27:
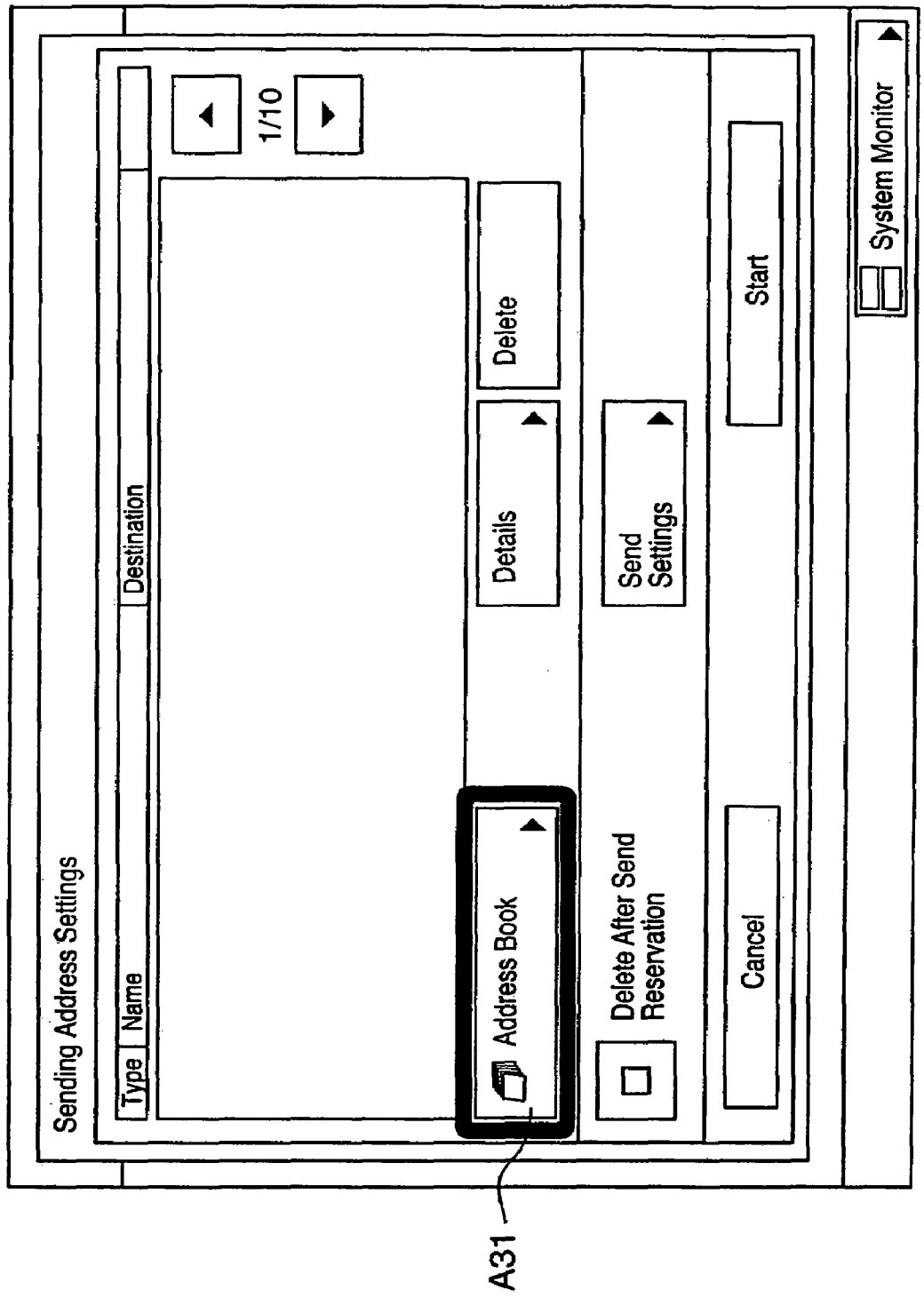
Figure 28:
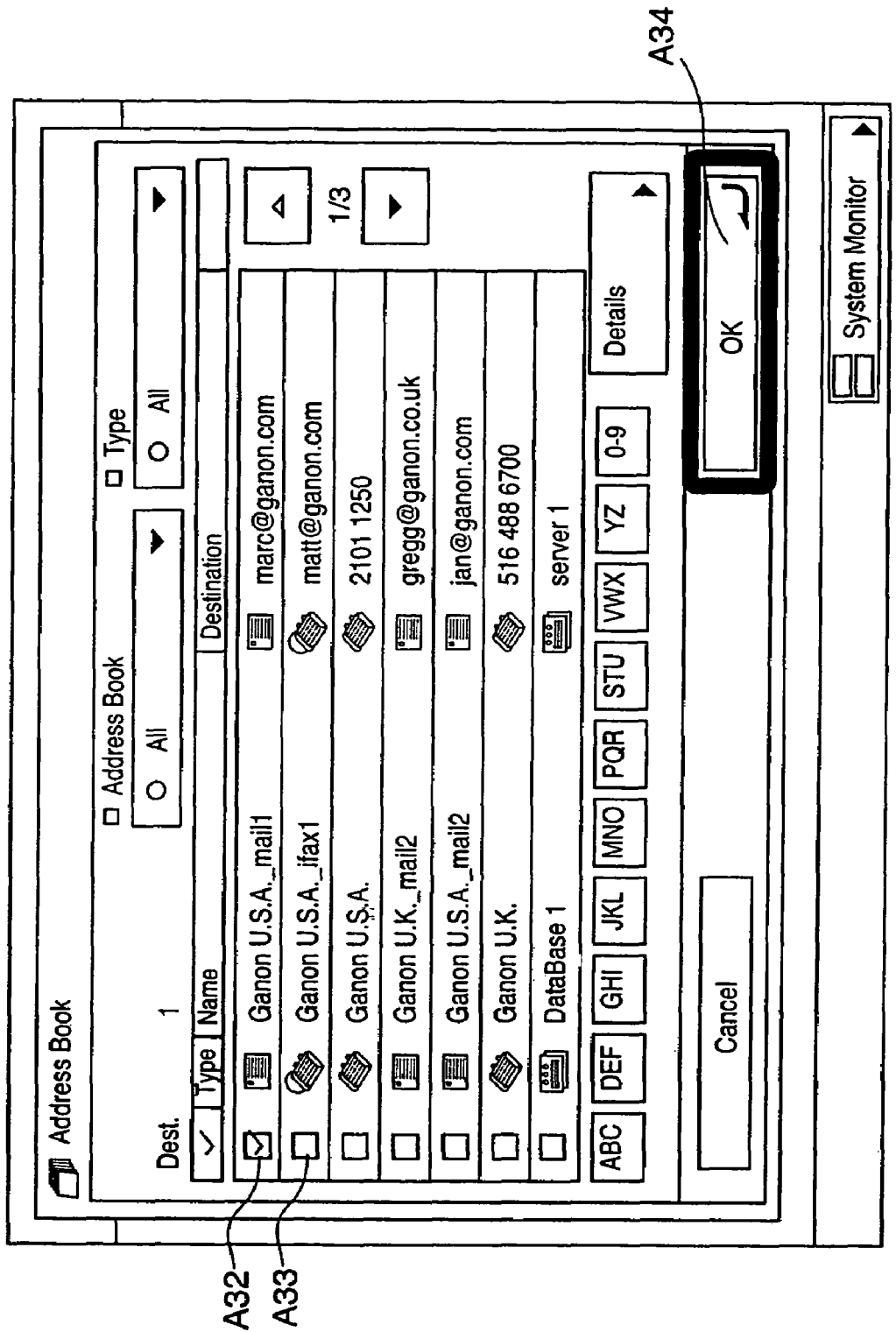

In step S23008, a [Send] key A30 is pressed for transmission setting to display the Sending Address Settings window shown in FIG. 27. In this case, to transmit the image data to an address registered in the Address Book in advance, an [Address Book] key A31 is pressed to display the Address Book window shown in FIG. 28. To select transmission to marc@canon.com by e-mail and to matt@canon.com by Internet FAX, the user presses keys A32 and A33. In accordance with this selection, the transmission protocol (SMTP) and pieces of information necessary for transmission (user name and password necessary for an access to the SMTP server) are set in addition to the e-mail addresses. When FTP is selected as the transmission protocol, the address information contains the server name, the user name on the server, the password, and the directory name. After login processing, storage processing is executed.

Figure 29:
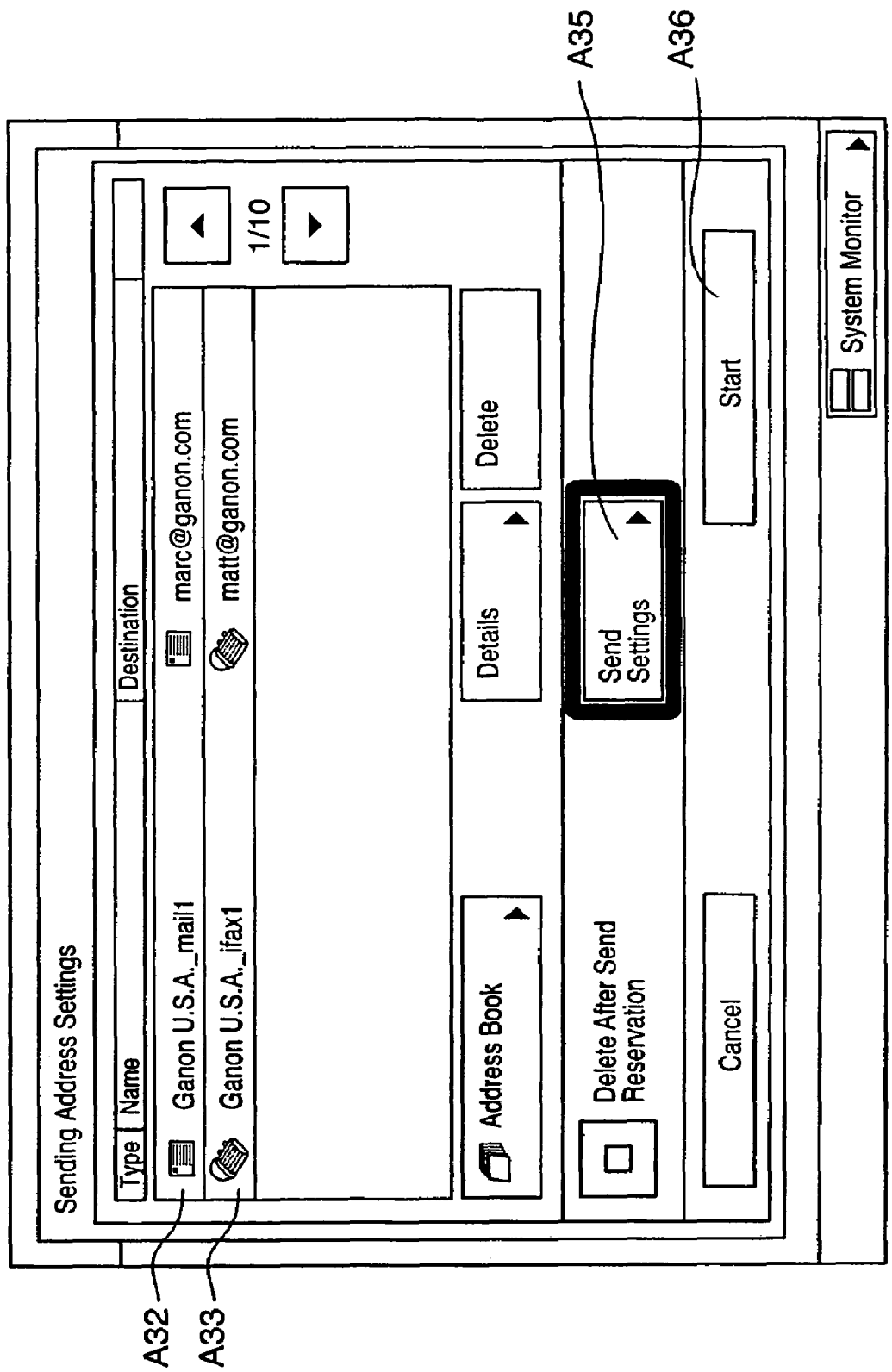

After the keys A32 and A33 are selected, an [OK] key A34 is pressed to set these addresses. The window returns to the Sending Address Settings window. As shown in FIG. 29, the set addresses are input.

When the file type is set in step S23009 as described above, and the start button of the operation section 2012 is pressed in step S23010, the three selected image data are linked in their order and transmitted as one file according to a processing procedure (to be described later) in step S23011.

As the image format for transmission, S-TIFF, M-TIFF, or PDF can be selected for a monochrome image, and JPEG or PDF can be selected for a color image or a combination of monochrome and color images. However, as the above-described data format capable of putting image data into one file, M-TIFF or PDF need be selected for only a monochrome image, and PDF need be selected for only a color image or for a combination of monochrome and color images. In the following description, assume that such a data format for converting images of a plurality of originals into one file is selected.

The transmission start timing should be switched in accordance with the transmission protocol. If generation and transmission of a file can be executed in parallel, they are done so. If not, transmission is started after completing a file.

When it is determined in step S23012 that transmission is ended, the series of transmission processing operations are ended.

Figure 30:
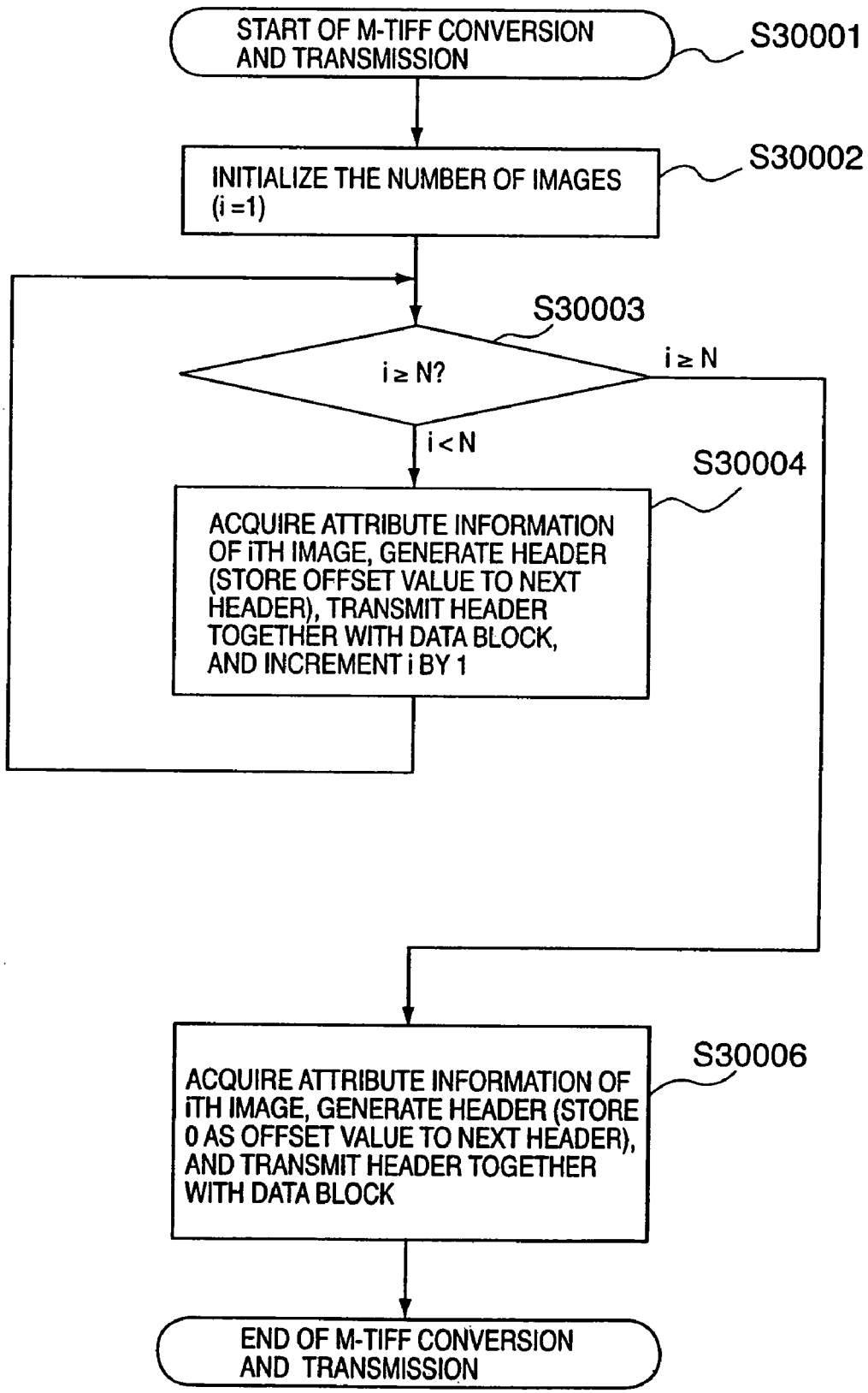
FIGS. 30 and 31 are flow charts showing processing procedures according to the third embodiment.
Figure 31:
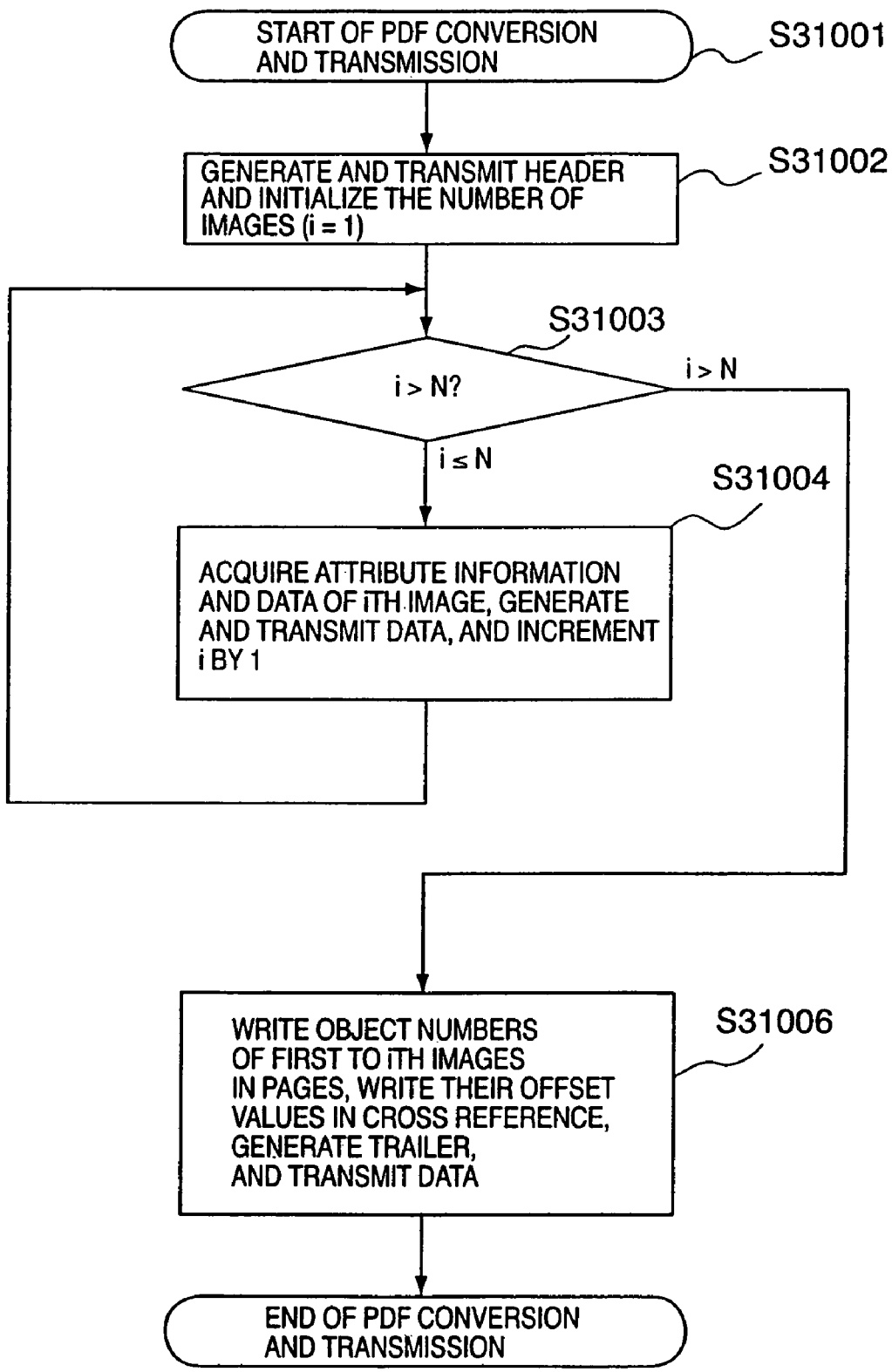

In the flow charts shown in FIGS. 30 and 31, the file formats shown in FIGS. 4 and 5 are referred to.

The flow charts in FIGS. 30 and 31 show the flows of processing controlled by the CPU 2001 on the basis of a program stored in the ROM 2003 and/or HDD 2004.

FIG. 30 is a flow chart showing processing of linking a plurality of image data and transmitting them as one file, which is executed by the copying machine according to this embodiment. The processing shown in FIG. 30 is executed by a file server transmission component 3007 or mail transmission component 3008 in accordance with the image data transmission destination. In the following description, the number of transmission image data selected by the user is N (N is a natural number of 2 or more).

When conversion into an M-TIFF file and transmission of the file are started in step S30001, a variable i representing the number of transmitted images is initialized to 1 in step S30002. The total number N of images to be transmitted is compared with the variable i in step S30003. If the variable i is smaller than the number N, the flow advances to step S30004. If the variable i is equal to or larger than the number N, the flow advances to step S30006.

In step S30004, pieces of attribute information of the image of the ith original are acquired from a Box where the image is stored, an offset value to a header is obtained from the data size, and a header is generated and transmitted. Simultaneously, the stored image data is read out and transmitted. When transmission is ended, the variable i is incremented by one, and the flow returns to step S30003.

When the variable i equals the number N, transmission processing is executed in step S30006, as in step S30004, and conversion and transmission processing are ended. As described above, 0 is stored as an offset value to the next header, which is contained in an Nth header 4011.

FIG. 31 is a flow chart showing processing of conversion from an S-TIFF file or JPEG file to a PDF file and transmission processing, which are executed by the copying machine according to this embodiment. The processing shown in FIG. 31 is executed by the file server transmission component 3007 or mail transmission component 3008 in accordance with the image data transmission destination. In the following description, the number of transmission image data selected by the user is N (N is a natural number of 2 or more).

When conversion into a PDF file and transmission of the file are started in step S31001, a header is generated, and the variable i representing the number of transmitted images is initialized to 1 in step S31002.

The total number N of images to be transmitted is compared with the variable i in step S31003. If the variable i is equal to or smaller than the number N, the flow advances to step S31004. If the variable i is larger than the number N, the flow advances to step S31006. In step S31004, pieces of attribute information and data of the ith image data are acquired from a Box where the image data is stored, data is generated and transmitted, and the variable i is incremented by one. Then, the flow returns to step S31003.

When the variable i is bigger than the number N, the object numbers of the first to Nth images are written in Pages 5010, offset values thereof are written in a Cross Reference 5011, and a Trailer 5012 is generated and transmitted in step S31006.

In the above-described embodiments, only an arrangement in which image data temporarily stored as a data format such as S-TIFF or JPEG is converted into the M-TIFF or PDF format in transmission has been described. A plurality of originals may be converted into a file format such as M-TIFF or PDF at the time of reading and storing the images without any conversion in transmission.

The client computer 1005 may have a remote control function for the operation section 2012 of the copying machine 1001 such that the user can input from the client computer 1005 an instruction that can be selected or input using the operation section 2012 of the copying machine 1001.

The encoding scheme used in storing image data or the data format for putting a plurality of stored image data into one file are not limited to those described in the above embodiments, and any other scheme or format can be used.

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is achieved even by supplying a storage medium (or recording medium) which records software program codes for implementing the functions of the above-described embodiments to the system or apparatus and causing the computer (or a CPU or MPU) of the system or apparatus to read out and execute the program codes stored in the storage medium. In this case, the program codes read out from the storage medium implement the functions of the above-described embodiments by themselves, and the storage medium which stores the program codes constitutes the present invention. The functions of the above-described embodiments are also implemented not only when the readout program codes are executed by the computer but also when the operation system (OS) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the storage medium, the storage medium stores program codes corresponding to the above-described flow charts.

As many apparently widely different embodiments of the present invention can be made without departing from the spirit and scope thereof, it is to be understood that the invention is not limited to the specific embodiments thereof except as defined in the appended claims.

What is claimed is:

1. A data processing apparatus comprising:
    an input unit, adapted to input data;
    an entering unit, adapted to enter an instruction of a file processing;
    a creation unit, adapted to create a single file based on the data input by said input unit in accordance with the instruction entered by said entering unit, the single file having a plurality of pages and including a page attribute and either information indicating that a next page exists or end information representing an end of data for each page of the plurality of pages; and
    an adding unit, adapted to, in a case where file creation by said creation unit is interrupted, add end information to the single file whose creation is interrupted in spite of the creation of the single file by said creation unit being incomplete.

2. The apparatus according to claim 1, wherein said input unit inputs the data representing an image from a reader adapted to read the image on a document.

3. The apparatus according to claim 1, wherein said entering unit enters the instruction indicating a kind of the file, and said creation unit creates the file in accordance with the instructed kind of the file.

4. The apparatus according to claim 3, wherein the kind of file includes a PDF file or a TIFF file.

5. A data processing method comprising:
    an input step of inputting data;
    an entering step of entering an instruction of a file processing;
    a creation step of creating a single file based on the data input in said input step in accordance with the instruction entered in said entering step, the single file having a plurality of pages and including a page attribute and either information indicating that a next page exists or end information representing an end of data for each page of the plurality of pages; and
    an adding step of, in a case where file creation in said creation step is interrupted, add end information to the single file whose creation is interrupted in spite of the creation of the single file in said creation step being incomplete.

6. A computer-readable medium storing a computer-executable program, the computer-executable program, comprising:
    an input step of inputting data;
    an entering step of entering an instruction of a file processing;
    a creation step of creating a single file based on the data input in said input step in accordance with the instruction entered in said entering step, the single file having a plurality of pages and including a page attribute and either information indicating that a next page exists or end information representing an end of data for each page of the plurality of pages; and
    an adding step of, in a case where file creation in said creation step is interrupted, add end information to the single file whose creation is interrupted in spite of the creation of the single file in said creation step being incomplete.

* * * * *

UNITED STATES PATENT AND TRADEMARK OFFICE
CERTIFICATE OF CORRECTION

PATENT NO. : 7,321,445 B2
APPLICATION NO. : 11/212651
DATED : January 22, 2008
INVENTOR(S) : Sato Page 1 of 1

It is certified that error appears in the above-identified patent and that said Letters Patent is hereby corrected as shown below:

COLUMN 4:
Line 49, "soon." should read -- so on. --.

COLUMN 8:
Line 13, "flow-of" should read -- flow of --.

COLUMN 9:
Line 32, "a second" should read -- second --; and
Line 37, "a second" should read -- second --.

COLUMN 11:
Line 22, "are" should read -- is --.

COLUMN 13:
Line 27, "information" should read -- items of information --.

Signed and Sealed this

Nineteenth Day of August, 2008

JON W. DUDAS
*Director of the United States Patent and Trademark Office*